(12) United States Patent
Verma et al.

(10) Patent No.: US 10,880,066 B2
(45) Date of Patent: Dec. 29, 2020

(54) MULTIPLEXING CLIENTS IN WIRELESS LOCAL AREA NETWORK TRANSMISSIONS

(71) Applicant: QUALCOMM Incorporated, San Diego, CA (US)

(72) Inventors: Lochan Verma, San Diego, CA (US); Bin Tian, San Diego, CA (US); Sameer Vermani, San Diego, CA (US); Lin Yang, San Diego, CA (US); Jialing Li Chen, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 16/254,352

(22) Filed: Jan. 22, 2019

(65) Prior Publication Data

US 2019/0238301 A1   Aug. 1, 2019

Related U.S. Application Data

(60) Provisional application No. 62/623,989, filed on Jan. 30, 2018.

(51) Int. Cl.
| | |
|---|---|
| *H04L 5/00* | (2006.01) |
| *H04W 72/04* | (2009.01) |
| *H04L 1/00* | (2006.01) |
| *H04W 74/00* | (2009.01) |
| *H04W 84/12* | (2009.01) |

(52) U.S. Cl.
CPC .......... *H04L 5/0094* (2013.01); *H04L 1/0013* (2013.01); *H04L 5/0041* (2013.01); *H04L 5/0046* (2013.01); *H04L 5/0053* (2013.01); *H04L 5/0064* (2013.01);

(Continued)

(58) Field of Classification Search
None
See application file for complete search history.

(56) References Cited

U.S. PATENT DOCUMENTS

2016/0127228 A1*  5/2016  Liu ..................... H04L 25/0208
                                                     370/338
2016/0329999 A1* 11/2016  Li  ........................ H04L 5/0053
(Continued)

OTHER PUBLICATIONS

International Search Report and Written Opinion—PCT/US2019/014768—ISA/EPO—dated Apr. 15, 2019.

*Primary Examiner* — Jamaal Henson
(74) *Attorney, Agent, or Firm* — Holland & Hart LLP/Qualcomm

(57) ABSTRACT

This disclosure provides systems, methods, and apparatus, including computer programs encoded on computer-readable media, for multiplexing clients in a wireless communication network. In one aspect, a wireless station (STA) receives a preamble including a first wireless local area network (WLAN) signaling field from an access point (AP). The first WLAN signaling field includes first and second indications of first and second channel bandwidths. The first channel bandwidth includes a first set of subchannels and used by the AP to communicate with a first set of stations. The second channel bandwidth may include the first set of subchannels and a second set of subchannels and used by the AP to communicate with a second set of stations. The STA may identify a location of at least one second WLAN signaling field for the STA based on the first and second indications of the first and second channel bandwidths.

28 Claims, 18 Drawing Sheets

(52) U.S. Cl.
CPC ...... *H04W 72/0453* (2013.01); *H04W 74/002* (2013.01); *H04W 84/12* (2013.01)

(56) References Cited

U.S. PATENT DOCUMENTS

| | | | | |
|---|---|---|---|---|
| 2016/0330058 | A1* | 11/2016 | Chen | H04L 27/2602 |
| 2016/0330715 | A1 | 11/2016 | Chen et al. | |
| 2016/0352552 | A1* | 12/2016 | Liu | H04B 1/7176 |
| 2016/0366701 | A1* | 12/2016 | Chu | H04W 74/004 |
| 2016/0374017 | A1* | 12/2016 | Stacey | H04L 5/0053 |
| 2017/0041171 | A1* | 2/2017 | Li | H04L 5/0053 |
| 2017/0041929 | A1 | 2/2017 | Noh et al. | |
| 2017/0181129 | A1 | 6/2017 | Bharadwaj et al. | |
| 2017/0295560 | A1* | 10/2017 | Kim | H04L 5/0055 |
| 2017/0366310 | A1 | 12/2017 | Verma et al. | |
| 2017/0373808 | A1* | 12/2017 | Park | H04L 5/0023 |

\* cited by examiner

P160 HE-SIG-B #1 745

P160 HE-SIG-B #2 750

S160 HE-SIG-B #1 755

S160 HE-SIG-B #2 760

MULTIPLEXING CLIENTS IN WIRELESS LOCAL AREA NETWORK TRANSMISSIONS

CROSS REFERENCES TO RELATED APPLICATIONS

The present Application for Patent claims the benefit of U.S. Provisional Patent Application No. 62/623,989 by VERMA, et al., entitled "MULTIPLEXING CLIENTS IN WIRELESS LOCAL AREA NETWORK TRANSMISSIONS," filed Jan. 30, 2018, assigned to the assignee hereof, and expressly incorporated herein.

TECHNICAL FIELD

The present disclosure relates generally to wireless communication, and more specifically to multiplexing clients in wireless local area network transmissions.

DESCRIPTION OF THE RELATED TECHNOLOGY

Wireless communications systems are widely deployed to provide various types of communication content such as voice, video, packet data, messaging, broadcast, and so on. These systems may be multiple-access systems capable of supporting communication with multiple users by sharing the available system resources (such as time, frequency, and power). A wireless network, for example a wireless local area network (WLAN), such as a Wi-Fi (i.e., Institute of Electrical and Electronics Engineers (IEEE) 802.11) network may include an access point (AP) that may communicate with one or more stations (STAs) or mobile devices. The AP may be coupled to a network, such as the Internet, and may enable a mobile device to communicate via the network (or communicate with other devices coupled to the access point). A wireless device may communicate with a network device bi-directionally. For example, in a WLAN, a STA may communicate with an associated AP via downlink and uplink. The downlink (or forward link) may refer to the communication link from the AP to the station, and the uplink (or reverse link) may refer to the communication link from the station to the AP.

Some WLANs may support wireless stations (STAs) with different capabilities. For example, some STAs may be capable of orthogonal frequency division multiple access (OFDMA) communications using different sized bandwidth or have other different capabilities. An access point may attempt to allocate resources for these STAs. However, some resource allocation conventions for a first STA may be unable to interpret the resource allocation conventions of a second STA with a different set of capabilities, which may cause a malfunction. For example, the second STA may support a wider bandwidth than the first STA. As such, improved resource allocation techniques are needed.

SUMMARY

The systems, methods and devices of this disclosure each have several innovative aspects, no single one of which is solely responsible for the desirable attributes disclosed herein.

A method of wireless communication is described. The method may include receiving, from an access point, a preamble that includes a first WLAN signaling field including a first indication of a first channel bandwidth and a second indication, where the access point uses the first channel bandwidth to communicate with a first set of stations and a second channel bandwidth to communicate with a second set of stations, and where the first channel bandwidth includes a first set of subchannels and the second channel bandwidth includes a second set of subchannels and determining, based on the first indication of the first channel bandwidth and the second indication, a location of at least one second WLAN signaling field.

An apparatus for wireless communication is described. The apparatus may include a first interface configured to receive, from an access point, a preamble that includes a first WLAN signaling field including a first indication of a first channel bandwidth and a second indication, where the access point uses the first channel bandwidth to communicate with a first set of stations and a second channel bandwidth to communicate with a second set of stations, and where the first channel bandwidth includes a first set of subchannels and the second channel bandwidth includes a second set of subchannels. The apparatus may further include a processing system to determine, based on the first indication of the first channel bandwidth and the second indication, a location of at least one second WLAN signaling field.

Another apparatus for wireless communication is described. The apparatus may include means for receiving, from an access point, a preamble that includes a first WLAN signaling field including a first indication of a first channel bandwidth and a second indication, where the access point uses the first channel bandwidth to communicate with a first set of stations and a second channel bandwidth to communicate with a second set of stations, and where the first channel bandwidth includes a first set of subchannels and the second channel bandwidth includes a second set of subchannels and determining, based on the first indication of the first channel bandwidth and the second indication, a location of at least one second WLAN signaling field.

A non-transitory computer-readable medium storing code for wireless communication is described. The code may include instructions executable by a processor to receive, from an access point, a preamble that includes a first WLAN signaling field including a first indication of a first channel bandwidth and a second indication, where the access point uses the first channel bandwidth to communicate with a first set of stations and a second channel bandwidth to communicate with a second set of stations, and where the first channel bandwidth includes a first set of subchannels and the second channel bandwidth includes a second set of subchannels and determine, based on the first indication of the first channel bandwidth and the second indication, a location of at least one second WLAN signaling field.

Some examples of the method, apparatuses, and non-transitory computer-readable medium described herein may further include operations, features, means, or instructions for determining the second channel bandwidth based on the second indication, the location of the at least one second WLAN signaling field determined based on the second channel bandwidth.

In some examples of the method, apparatuses, and non-transitory computer-readable medium described herein, the second channel bandwidth may be a maximum channel bandwidth, and the location of the at least one second WLAN signaling field may be in the second channel bandwidth.

In some examples of the method, apparatuses, and non-transitory computer-readable medium described herein, the second channel bandwidth may be a maximum channel bandwidth, and the location of the at least one second WLAN signaling field may be in the first channel bandwidth.

Some examples of the method, apparatuses, and non-transitory computer-readable medium described herein may further include operations, features, means, or instructions for identifying, based on the second indication, that a first subset of the first set of subchannels may be punctured, where the location of the at least one second WLAN signaling field may be determined to be in the first subset of the first set of subchannels identified as punctured.

Some examples of the method, apparatuses, and non-transitory computer-readable medium described herein may further include operations, features, means, or instructions for decoding a first of the at least one second WLAN signaling field in the first subset of the first set of subchannels identified as punctured, and determining a first resource allocation for data transmissions in the second channel bandwidth based on the decoded first of the at least one second WLAN signaling field.

In some examples of the method, apparatuses, and non-transitory computer-readable medium described herein, the second indication includes a value of a bandwidth field of the first WLAN signaling field that indicates that the first subset of the first set of subchannels may be punctured.

In some examples of the method, apparatuses, and non-transitory computer-readable medium described herein, the first indication includes an indication of preamble puncturing for the first channel bandwidth that indicates that the first subset of the first set of subchannels may be punctured.

In some examples of the method, apparatuses, and non-transitory computer-readable medium described herein, the at least one second WLAN signaling field includes two alternating WLAN signaling field content channels spanning the first channel bandwidth or the second channel bandwidth.

Some examples of the method, apparatuses, and non-transitory computer-readable medium described herein may further include operations, features, means, or instructions for decoding the at least one second WLAN signaling field, the determined location of the at least one second WLAN signaling field in the second channel bandwidth, and determining a resource allocation for data transmissions in the second channel bandwidth based on the decoded at least one second WLAN signaling field.

Some examples of the method, apparatuses, and non-transitory computer-readable medium described herein may further include operations, features, means, or instructions for decoding the at least one second WLAN signaling field, the determined location of the at least one second WLAN signaling field in the first channel bandwidth, and determining a resource allocation for data transmissions in the second channel bandwidth based on the decoded at least one second WLAN signaling field.

In some examples of the method, apparatuses, and non-transitory computer-readable medium described herein, the determined resource allocation for data transmissions in the second channel bandwidth may be exclusive of the first channel bandwidth.

In some examples of the method, apparatuses, and non-transitory computer-readable medium described herein, the first indication of the first channel bandwidth includes a value of a bandwidth field of the first WLAN signaling field.

In some examples of the method, apparatuses, and non-transitory computer-readable medium described herein, the second indication includes a combination of a value of a dual carrier modulation (DCM) field of the first WLAN signaling field and a value of a modulation and coding scheme (MCS) field of the first WLAN signaling field, the DCM field and the MCS field applicable to the second WLAN signaling field.

In some cases, the apparatus may be included in a station.

A method of wireless communication is described. The method may include generating a first WLAN signaling field including a first indication of a first channel bandwidth and a second indication, where the first channel bandwidth includes a first set of subchannels and a second channel bandwidth includes a second set of subchannels, and where the first WLAN signaling field identifies a location of a set of second WLAN signaling fields in the first set of subchannels and the second set of subchannels and transmitting a preamble for transmission by an access point to one or more stations of a first set of stations or a second set of stations, where the preamble includes the first WLAN signaling field and the set of second WLAN signaling fields, and the access point uses the first channel bandwidth to communicate with the first set of stations and the second channel bandwidth to communicate with the second set of stations.

An apparatus for wireless communication is described. The apparatus may include a processing system to generate a first WLAN signaling field including a first indication of a first channel bandwidth and a second indication, where the first channel bandwidth includes a first set of subchannels and a second channel bandwidth includes a second set of subchannels, and where the first WLAN signaling field identifies a location of a set of second WLAN signaling fields in the first set of subchannels and the second set of subchannels. The apparatus may further include an interface configured to output a preamble for transmission by an access point to one or more stations of a first set of stations or a second set of stations, where the preamble includes the first WLAN signaling field and the set of second WLAN signaling fields, and the access point uses the first channel bandwidth to communicate with the first set of stations and the second channel bandwidth to communicate with the second set of stations.

Another apparatus for wireless communication is described. The apparatus may include means for generating a first WLAN signaling field including a first indication of a first channel bandwidth and a second indication, where the first channel bandwidth includes a first set of subchannels and a second channel bandwidth includes a second set of subchannels, and where the first WLAN signaling field identifies a location of a set of second WLAN signaling fields in the first set of subchannels and the second set of subchannels and transmitting a preamble for transmission by an access point to one or more stations of a first set of stations or a second set of stations, where the preamble includes the first WLAN signaling field and the set of second WLAN signaling fields, and the access point uses the first channel bandwidth to communicate with the first set of stations and the second channel bandwidth to communicate with the second set of stations.

A non-transitory computer-readable medium storing code for wireless communication is described. The code may include instructions executable by a processor to generate a first WLAN signaling field including a first indication of a first channel bandwidth and a second indication, where the first channel bandwidth includes a first set of subchannels and a second channel bandwidth includes a second set of subchannels, and where the first WLAN signaling field identifies a location of a set of second WLAN signaling fields in the first set of subchannels and the second set of subchannels and transmit a preamble for transmission by an access point to one or more stations of a first set of stations or a second set of stations, where the preamble includes the first WLAN signaling field and the set of second WLAN signaling fields, and the access point uses the first channel bandwidth to communicate with the first set of stations and the second channel bandwidth to communicate with the second set of stations.

In some examples of the method, apparatuses, and non-transitory computer-readable medium described herein, the second indication indicates the second channel bandwidth.

In some examples of the method, apparatuses, and non-transitory computer-readable medium described herein, the second indication identifies a first subset of the first set of subchannels as punctured.

In some examples of the method, apparatuses, and non-transitory computer-readable medium described herein, the second indication that identifies the first subset of the first set of subchannels as punctured includes an indication of preamble puncturing for the first channel bandwidth.

Some examples of the method, apparatuses, and non-transitory computer-readable medium described herein may further include operations, features, means, or instructions for generating a first set of the set of second WLAN signaling fields for the first set of stations in the first set of subchannels, and generating a second set of the set of second WLAN signaling fields for the second set of stations in the second set of subchannels.

In some examples of the method, apparatuses, and non-transitory computer-readable medium described herein, the first set of the set of second WLAN signaling fields includes two alternating WLAN signaling field content channels spanning the first channel bandwidth, and the second set of the set of second WLAN signaling fields includes two alternating WLAN signaling field content channels spanning the second channel bandwidth.

In some examples of the method, apparatuses, and non-transitory computer-readable medium described herein, the first indication of the first channel bandwidth includes a value of a bandwidth field of the first WLAN signaling field.

In some examples of the method, apparatuses, and non-transitory computer-readable medium described herein, the second indication includes a combination of a value of a DCM field of the first WLAN signaling field and a value of an MCS field of the first WLAN signaling field, the DCM field and the MCS field applicable to the second WLAN signaling field.

In some examples of the method, apparatuses, and non-transitory computer-readable medium described herein, the first WLAN signaling field includes a high efficiency signaling A (HE-SIG-A) field, or a legacy signaling field (L-SIG), or a repeated L-SIG (RL-SIG) field, or a combination thereof, where the second channel bandwidth may be indicated at least in part by the L-SIG field, or the RL-SIG field, or a combination thereof.

Some examples of the method, apparatuses, and non-transitory computer-readable medium described herein may further include operations, features, means, or instructions for allocating resource units for data transmissions to the first set of stations in the first channel bandwidth exclusive of the second channel bandwidth, and allocating resource units for data transmissions to the second set of stations in the second channel bandwidth exclusive of the first channel bandwidth.

In some instances, the apparatus may be included in an access point.

A method of wireless communication at an access point is described. The method may include generating a first WLAN signaling field including a first indication of a first channel bandwidth and a second indication, the access point using the first channel bandwidth to communicate with a first set of stations and a second channel bandwidth to communicate with a second set of stations, where the first channel bandwidth includes a first set of subchannels and the second channel bandwidth includes a second set of subchannels, and where the first WLAN signaling field identifies a location of a set of second WLAN signaling fields in the first set of subchannels and the second set of subchannels and transmitting a preamble that includes the first WLAN signaling field and the set of second WLAN signaling fields.

An apparatus for wireless communication at an access point is described. The apparatus may include a processor, memory in electronic communication with the processor, and instructions stored in the memory. The instructions may be executable by the processor to cause the apparatus to generate a first WLAN signaling field including a first indication of a first channel bandwidth and a second indication, the access point using the first channel bandwidth to communicate with a first set of stations and a second channel bandwidth to communicate with a second set of stations, where the first channel bandwidth includes a first set of subchannels and the second channel bandwidth includes a second set of subchannels, and where the first WLAN signaling field identifies a location of a set of second WLAN signaling fields in the first set of subchannels and the second set of subchannels and transmit a preamble that includes the first WLAN signaling field and the set of second WLAN signaling fields.

Another apparatus for wireless communication at an access point is described. The apparatus may include means for generating a first WLAN signaling field including a first indication of a first channel bandwidth and a second indication, the access point using the first channel bandwidth to communicate with a first set of stations and a second channel bandwidth to communicate with a second set of stations, where the first channel bandwidth includes a first set of subchannels and the second channel bandwidth includes a second set of subchannels, and where the first WLAN signaling field identifies a location of a set of second WLAN signaling fields in the first set of subchannels and the second set of subchannels and transmitting a preamble that includes the first WLAN signaling field and the set of second WLAN signaling fields.

A non-transitory computer-readable medium storing code for wireless communication at an access point is described. The code may include instructions executable by a processor to generate a first WLAN signaling field including a first indication of a first channel bandwidth and a second indication, the access point using the first channel bandwidth to communicate with a first set of stations and a second channel bandwidth to communicate with a second set of stations, where the first channel bandwidth includes a first set of subchannels and the second channel bandwidth includes a second set of subchannels, and where the first WLAN signaling field identifies a location of a set of second WLAN signaling fields in the first set of subchannels and the second set of subchannels and transmit a preamble that includes the first WLAN signaling field and the set of second WLAN signaling fields.

A method of wireless communication is described. The method may include receiving, from an access point, a preamble that includes a first WLAN signaling field, the first WLAN signaling field including a first indication of a first channel bandwidth and a second indication of a second channel bandwidth, the first channel bandwidth including a first set of subchannels and used by the access point to communicate with a first set of stations, and the second channel bandwidth including the first set of subchannels and a second set of subchannels, and the second channel bandwidth used by the access point to communicate with a second set of stations and identifying a location of at least one second WLAN signaling field for the station based at least in part on the first indication of the first channel bandwidth and the second indication of the second channel bandwidth.

An apparatus for wireless communication is described. The apparatus may include means for receiving, from an access point, a preamble that includes a first WLAN signaling field, the first WLAN signaling field including a first indication of a first channel bandwidth and a second indication of a second channel bandwidth, the first channel bandwidth including a first set of subchannels and used by the access point to communicate with a first set of stations, and the second channel bandwidth including the first set of subchannels and a second set of subchannels, and the second channel bandwidth used by the access point to communicate with a second set of stations and means for identifying a location of at least one second WLAN signaling field for the station based at least in part on the first indication of the first channel bandwidth and the second indication of the second channel bandwidth.

Another apparatus for wireless communication is described. The apparatus may include a processor, memory in electronic communication with the processor, and instructions stored in the memory. The instructions may be operable to cause the processor to receive, from an access point, a preamble that includes a first WLAN signaling field, the first WLAN signaling field including a first indication of a first channel bandwidth and a second indication of a second channel bandwidth, the first channel bandwidth including a first set of subchannels and used by the access point to communicate with a first set of stations, and the second channel bandwidth including the first set of subchannels and a second set of subchannels, and the second channel bandwidth used by the access point to communicate with a second set of stations and identify a location of at least one second WLAN signaling field for the station based at least in part on the first indication of the first channel bandwidth and the second indication of the second channel bandwidth.

A non-transitory computer-readable medium for wireless communication is described. The non-transitory computer-readable medium may include instructions operable to cause a processor to receive, from an access point, a preamble that includes a first WLAN signaling field, the first WLAN signaling field including a first indication of a first channel bandwidth and a second indication of a second channel bandwidth, the first channel bandwidth including a first set of subchannels and used by the access point to communicate with a first set of stations, and the second channel bandwidth including the first set of subchannels and a second set of subchannels, and the second channel bandwidth used by the access point to communicate with a second set of stations and identify a location of at least one second WLAN signaling field for the station based at least in part on the first indication of the first channel bandwidth and the second indication of the second channel bandwidth.

Some examples of the method, apparatus, and non-transitory computer-readable medium described above may further include processes, features, means, or instructions for decoding the first WLAN signaling field in at least one subchannel of the set of subchannels of the first channel bandwidth.

In some examples of the method, apparatus, and non-transitory computer-readable medium described above, identifying the location of the at least one second WLAN signaling field for the station includes: determining that the second indication of the second channel bandwidth indicates a maximum channel bandwidth of the station. Some examples of the method, apparatus, and non-transitory computer-readable medium described above may further include processes, features, means, or instructions for identifying, based at least in part on the determination, that the location of the at least one second WLAN signaling field for the station may be in the second channel bandwidth.

In some examples of the method, apparatus, and non-transitory computer-readable medium described above, identifying the location of the at least one second WLAN signaling field for the station includes: determining that the first indication of the first channel bandwidth indicates a maximum channel bandwidth of the station. Some examples of the method, apparatus, and non-transitory computer-readable medium described above may further include processes, features, means, or instructions for identifying, based at least in part on the determination, that the location of the at least one second WLAN signaling field for the station may be in the first channel bandwidth.

In some examples of the method, apparatus, and non-transitory computer-readable medium described above, the at least one second WLAN signaling field includes two alternating WLAN signaling field content channels spanning the first channel bandwidth or the second channel bandwidth.

Some examples of the method, apparatus, and non-transitory computer-readable medium described above may further include processes, features, means, or instructions for decoding the at least one second WLAN signaling field for the station, the identified location of the at least one second WLAN signaling field in the second channel bandwidth. Some examples of the method, apparatus, and non-transitory computer-readable medium described above may further include processes, features, means, or instructions for determining a resource allocation for data transmissions to the station in the second channel bandwidth based at least in part on the decoded at least one second WLAN signaling field.

Some examples of the method, apparatus, and non-transitory computer-readable medium described above may further include processes, features, means, or instructions for decoding the at least one second WLAN signaling field for the station, the identified location of the at least one second WLAN signaling field in the first channel bandwidth. Some examples of the method, apparatus, and non-transitory computer-readable medium described above may further include processes, features, means, or instructions for determining a resource allocation for data transmissions to the station in the second channel bandwidth based at least in part on the decoded at least one second WLAN signaling field.

In some examples of the method, apparatus, and non-transitory computer-readable medium described above, the determined resource allocation for data transmissions to the station in the second channel bandwidth may be exclusive of the first channel bandwidth.

In some examples of the method, apparatus, and non-transitory computer-readable medium described above, the first indication of the first channel bandwidth includes a value of a bandwidth field of the first WLAN signaling field.

In some examples of the method, apparatus, and non-transitory computer-readable medium described above, the second indication of the second channel bandwidth includes a combination of a value of a DCM field of the first WLAN signaling field and a value of an MCS field of the first WLAN signaling field, the DCM field and the MCS field applicable to the second WLAN signaling field.

In some examples of the method, apparatus, and non-transitory computer-readable medium described above, the DCM field includes a signaling B DCM (SIGB DCM) field. In some examples of the method, apparatus, and non-transitory computer-readable medium described above, the MCS field includes a signaling B MCS (SIGB MCS) field.

In some examples of the method, apparatus, and non-transitory computer-readable medium described above, the first WLAN signaling field includes a HE-SIG-A field. In some examples of the method, apparatus, and non-transitory computer-readable medium described above, the second WLAN signaling field includes a HE-SIG-B field.

A method of wireless communication is described. The method may include identifying a first indication of a first channel bandwidth, the first channel bandwidth including a first set of subchannels, and the first channel bandwidth used by the access point to communicate with a first set of stations, identifying a second indication of a second channel bandwidth, the second channel bandwidth including the first set of subchannels and a second set of subchannels, and the second channel bandwidth used by the access point to communicate with a second set of stations, generating a first WLAN signaling field that includes the first indication of the first channel bandwidth and the second indication of the second channel bandwidth, the first WLAN signaling field identifying a location of a plurality of second WLAN signaling fields in the first set of subchannels and the second set of subchannels, and transmitting a preamble that includes the first WLAN signaling field and the plurality of second WLAN signaling fields.

An apparatus for wireless communication is described. The apparatus may include means for identifying a first indication of a first channel bandwidth, the first channel bandwidth including a first set of subchannels, and the first channel bandwidth used by the access point to communicate with a first set of stations, means for identifying a second indication of a second channel bandwidth, the second channel bandwidth including the first set of subchannels and a second set of subchannels, and the second channel bandwidth used by the access point to communicate with a second set of stations, means for generating a first WLAN signaling field that includes the first indication of the first channel bandwidth and the second indication of the second channel bandwidth, the first WLAN signaling field identifying a location of a plurality of second WLAN signaling fields in the first set of subchannels and the second set of subchannels, and means for transmitting a preamble that includes the first WLAN signaling field and the plurality of second WLAN signaling fields.

Another apparatus for wireless communication is described. The apparatus may include a processor, memory in electronic communication with the processor, and instructions stored in the memory. The instructions may be operable to cause the processor to identify a first indication of a first channel bandwidth, the first channel bandwidth including a first set of subchannels, and the first channel bandwidth used by the access point to communicate with a first set of stations, identify a second indication of a second channel bandwidth, the second channel bandwidth including the first set of subchannels and a second set of subchannels, and the second channel bandwidth used by the access point to communicate with a second set of stations, generate a first WLAN signaling field that includes the first indication of the first channel bandwidth and the second indication of the second channel bandwidth, the first WLAN signaling field identifying a location of a plurality of second WLAN signaling fields in the first set of subchannels and the second set of subchannels, and transmit a preamble that includes the first WLAN signaling field and the plurality of second WLAN signaling fields.

A non-transitory computer-readable medium for wireless communication is described. The non-transitory computer-readable medium may include instructions operable to cause a processor to identify a first indication of a first channel bandwidth, the first channel bandwidth including a first set of subchannels, and the first channel bandwidth used by the access point to communicate with a first set of stations, identify a second indication of a second channel bandwidth, the second channel bandwidth including the first set of subchannels and a second set of subchannels, and the second channel bandwidth used by the access point to communicate with a second set of stations, generate a first WLAN signaling field that includes the first indication of the first channel bandwidth and the second indication of the second channel bandwidth, the first WLAN signaling field identifying a location of a plurality of second WLAN signaling fields in the first set of subchannels and the second set of subchannels, and transmit a preamble that includes the first WLAN signaling field and the plurality of second WLAN signaling fields.

Some examples of the method, apparatus, and non-transitory computer-readable medium described above may further include processes, features, means, or instructions for generating a first set of the plurality of second WLAN signaling fields for the first set of stations in the first set of subchannels. Some examples of the method, apparatus, and non-transitory computer-readable medium described above may further include processes, features, means, or instructions for generating a second set of the plurality of second WLAN signaling fields for the second set of stations in the second set of subchannels.

In some examples of the method, apparatus, and non-transitory computer-readable medium described above, the first set of the plurality of second WLAN signaling fields includes two alternating WLAN signaling field content channels spanning the first channel bandwidth.

In some examples of the method, apparatus, and non-transitory computer-readable medium described above, the second set of the plurality of second WLAN signaling fields includes two alternating WLAN signaling field content channels spanning the second channel bandwidth.

In some examples of the method, apparatus, and non-transitory computer-readable medium described above, the first indication of the first channel bandwidth includes a value of a bandwidth field of the first WLAN signaling field.

In some examples of the method, apparatus, and non-transitory computer-readable medium described above, the second indication of the second channel bandwidth includes a combination of a value of a DCM field of the first WLAN signaling field and a value of an MCS field of the first WLAN signaling field, the DCM field and the MCS field applicable to the second WLAN signaling field.

In some examples of the method, apparatus, and non-transitory computer-readable medium described above, the DCM field includes a SIGB DCM field. In some examples of the method, apparatus, and non-transitory computer-readable medium described above, the MCS field includes a SIGB MCS field.

In some examples of the method, apparatus, and non-transitory computer-readable medium described above, the first WLAN signaling field includes a HE-SIG-A field. In some examples of the method, apparatus, and non-transitory computer-readable medium described above, the second WLAN signaling field includes a HE-SIG-B field.

In some examples of the method, apparatus, and non-transitory computer-readable medium described above, the first WLAN signaling field includes a HE-SIG-A field, or a L-SIG, or a RL-SIG field, or a combination thereof, where the second channel bandwidth may be indicated at least in part by the L-SIG field, or the RL-SIG field, or a combination thereof.

Some examples of the method, apparatus, and non-transitory computer-readable medium described above may further include processes, features, means, or instructions for allocating resource units for data transmissions to the first set of stations in the first channel bandwidth exclusive of the second channel bandwidth. Some examples of the method, apparatus, and non-transitory computer-readable medium described above may further include processes, features, means, or instructions for allocating resource units for data transmissions to the second set of stations in the second channel bandwidth exclusive of the first channel bandwidth.

In some examples of the method, apparatus, and non-transitory computer-readable medium described above, the first channel bandwidth may be used by the access point to communicate with the first set of stations according to a first RAT, and the second set of stations according to a second RAT. In some examples of the method, apparatus, and non-transitory computer-readable medium described above, the second channel bandwidth may be used by the access point to communicate with the second set of stations according to the second RAT.

In some examples of the method, apparatus, and non-transitory computer-readable medium described above, the first channel bandwidth includes 160 MHz. In some examples of the method, apparatus, and non-transitory computer-readable medium described above, the second channel bandwidth includes 320 MHz.

A method of wireless communication is described. The method may include identifying a first channel bandwidth that includes a first subset of a first set of subchannels and a second subset of the first set of subchannels, the first channel bandwidth used by an access point to communicate with a first set of stations, identifying a second channel bandwidth that includes the first set of subchannels and a second set of subchannels, the second channel bandwidth used by the access point to communicate with a second set of stations, including the station, receiving, from the access point, a preamble that includes a first WLAN signaling field, the first WLAN signaling field including an indication of the first channel bandwidth, the indication identifying that the first subset of the first set of subchannels is punctured, and determining, based at least in part on the indication, a location of at least one second WLAN signaling field for the station in the first subset of the first set of subchannels identified as punctured.

An apparatus for wireless communication is described. The apparatus may include means for identifying a first channel bandwidth that includes a first subset of a first set of subchannels and a second subset of the first set of subchannels, the first channel bandwidth used by an access point to communicate with a first set of stations, means for identifying a second channel bandwidth that includes the first set of subchannels and a second set of subchannels, the second channel bandwidth used by the access point to communicate with a second set of stations, including the station, means for receiving, from the access point, a preamble that includes a first WLAN signaling field, the first WLAN signaling field including an indication of the first channel bandwidth, the indication identifying that the first subset of the first set of subchannels is punctured, and means for determining, based at least in part on the indication, a location of at least one second WLAN signaling field for the station in the first subset of the first set of subchannels identified as punctured.

Another apparatus for wireless communication is described. The apparatus may include a processor, memory in electronic communication with the processor, and instructions stored in the memory. The instructions may be operable to cause the processor to identify a first channel bandwidth that includes a first subset of a first set of subchannels and a second subset of the first set of subchannels, the first channel bandwidth used by an access point to communicate with a first set of stations, identify a second channel bandwidth that includes the first set of subchannels and a second set of subchannels, the second channel bandwidth used by the access point to communicate with a second set of stations, including the station, receive, from the access point, a preamble that includes a first WLAN signaling field, the first WLAN signaling field including an indication of the first channel bandwidth, the indication identifying that the first subset of the first set of subchannels is punctured, and determine, based at least in part on the indication, a location of at least one second WLAN signaling field for the station in the first subset of the first set of subchannels identified as punctured.

A non-transitory computer-readable medium for wireless communication is described. The non-transitory computer-readable medium may include instructions operable to cause a processor to identify a first channel bandwidth that includes a first subset of a first set of subchannels and a second subset of the first set of subchannels, the first channel bandwidth used by an access point to communicate with a first set of stations, identify a second channel bandwidth that includes the first set of subchannels and a second set of subchannels, the second channel bandwidth used by the access point to communicate with a second set of stations, including the station, receive, from the access point, a preamble that includes a first WLAN signaling field, the first WLAN signaling field including an indication of the first channel bandwidth, the indication identifying that the first subset of the first set of subchannels is punctured, and determine, based at least in part on the indication, a location of at least one second WLAN signaling field for the station in the first subset of the first set of subchannels identified as punctured.

Some examples of the method, apparatus, and non-transitory computer-readable medium described above may further include processes, features, means, or instructions for decoding a first of the at least one second WLAN signaling field for the station in the first subset of the first set of subchannels identified as punctured. Some examples of the method, apparatus, and non-transitory computer-readable medium described above may further include processes, features, means, or instructions for determining a first resource allocation for data transmissions to the station in the second channel bandwidth based at least in part on the decoded at least one second WLAN signaling field.

Some examples of the method, apparatus, and non-transitory computer-readable medium described above may further include processes, features, means, or instructions for decoding a second of the at least one second WLAN signaling field for the station in the second subset of the first set of subchannels. Some examples of the method, apparatus, and non-transitory computer-readable medium described above may further include processes, features, means, or instructions for determining a second resource allocation for data transmissions to the station in the first channel bandwidth based at least in part on the decoded second of the at least one second WLAN signaling field.

In some examples of the method, apparatus, and non-transitory computer-readable medium described above, the determined first resource allocation for data transmissions to the station in the second channel bandwidth may be exclusive of the first channel bandwidth.

In some examples of the method, apparatus, and non-transitory computer-readable medium described above, the indication of the first channel bandwidth, the indication identifying that the first subset of the first set of subchannels may be punctured, includes a value of a bandwidth field of the first WLAN signaling field.

In some examples of the method, apparatus, and non-transitory computer-readable medium described above, the indication of the first channel bandwidth, the indication identifying that the first subset of the first set of subchannels may be punctured, includes an indication of preamble puncturing for the first channel bandwidth, the first channel bandwidth including 160 MHz.

In some examples of the method, apparatus, and non-transitory computer-readable medium described above, the second subset of the first set of subchannels includes a first subchannel and a second subchannel of the first set of subchannels. In some examples of the method, apparatus, and non-transitory computer-readable medium described above, the first subset of the first set of subchannels includes a third subchannel and a fourth subchannel of the first set of subchannels.

In some examples of the method, apparatus, and non-transitory computer-readable medium described above, the first WLAN signaling field includes a HE-SIG-A field. In some examples of the method, apparatus, and non-transitory computer-readable medium described above, the at least one second WLAN signaling field includes at least one HE-SIG-B field.

A method of wireless communication is described. The method may include identifying a first channel bandwidth that includes a first subset of a first set of subchannels and a second subset of the first set of subchannels, the first channel bandwidth used by the access point to communicate with a first set of stations, identifying a second channel bandwidth that includes the first set of subchannels and a second set of subchannels, the second channel bandwidth used by the access point to communicate with a second set of stations, generating a first WLAN signaling field that includes an indication of the first channel bandwidth, the indication identifying the first subset of the first set of subchannels as punctured, and transmitting a preamble that includes the first WLAN signaling field, a second WLAN signaling field for the first channel bandwidth on the first subset of the first set of subchannels, and a second WLAN signaling field for the second channel bandwidth on the second subset of the first set of subchannels.

An apparatus for wireless communication is described. The apparatus may include means for identifying a first channel bandwidth that includes a first subset of a first set of subchannels and a second subset of the first set of subchannels, the first channel bandwidth used by the access point to communicate with a first set of stations, means for identifying a second channel bandwidth that includes the first set of subchannels and a second set of subchannels, the second channel bandwidth used by the access point to communicate with a second set of stations, means for generating a first WLAN signaling field that includes an indication of the first channel bandwidth, the indication identifying the first subset of the first set of subchannels as punctured, and means for transmitting a preamble that includes the first WLAN signaling field, a second WLAN signaling field for the first channel bandwidth on the first subset of the first set of subchannels, and a second WLAN signaling field for the second channel bandwidth on the second subset of the first set of subchannels.

Another apparatus for wireless communication is described. The apparatus may include a processor, memory in electronic communication with the processor, and instructions stored in the memory. The instructions may be operable to cause the processor to identify a first channel bandwidth that includes a first subset of a first set of subchannels and a second subset of the first set of subchannels, the first channel bandwidth used by the access point to communicate with a first set of stations, identify a second channel bandwidth that includes the first set of subchannels and a second set of subchannels, the second channel bandwidth used by the access point to communicate with a second set of stations, generate a first WLAN signaling field that includes an indication of the first channel bandwidth, the indication identifying the first subset of the first set of subchannels as punctured, and transmit a preamble that includes the first WLAN signaling field, a second WLAN signaling field for the first channel bandwidth on the first subset of the first set of subchannels, and a second WLAN signaling field for the second channel bandwidth on the second subset of the first set of subchannels.

A non-transitory computer-readable medium for wireless communication is described. The non-transitory computer-readable medium may include instructions operable to cause a processor to identify a first channel bandwidth that includes a first subset of a first set of subchannels and a second subset of the first set of subchannels, the first channel bandwidth used by the access point to communicate with a first set of stations, identify a second channel bandwidth that includes the first set of subchannels and a second set of subchannels, the second channel bandwidth used by the access point to communicate with a second set of stations, generate a first WLAN signaling field that includes an indication of the first channel bandwidth, the indication identifying the first subset of the first set of subchannels as punctured, and transmit a preamble that includes the first WLAN signaling field, a second WLAN signaling field for the first channel bandwidth on the first subset of the first set of subchannels, and a second WLAN signaling field for the second channel bandwidth on the second subset of the first set of subchannels.

In some examples of the method, apparatus, and non-transitory computer-readable medium described above, the indication of the first channel bandwidth, the indication identifying that the first subset of the first set of subchannels may be punctured, includes a value of a bandwidth field of the first WLAN signaling field.

In some examples of the method, apparatus, and non-transitory computer-readable medium described above, the indication of the first channel bandwidth, the indication identifying that the first subset of the first set of subchannels may be punctured, includes an indication of preamble puncturing for the first channel bandwidth, the first channel bandwidth including 160 MHz.

In some examples of the method, apparatus, and non-transitory computer-readable medium described above, the second subset of the first set of subchannels includes a first subchannel and a second subchannel of the first set of subchannels. In some examples of the method, apparatus, and non-transitory computer-readable medium described above, the first subset of the first set of subchannels includes a third subchannel and a fourth subchannel of the first set of subchannels.

A method of wireless communication is described. The method may include receiving, from an access point, a trigger frame that includes a WLAN common information field, the WLAN common information field including a first indication of a first channel bandwidth and a second indication of a second channel bandwidth, the first channel bandwidth including a first set of subchannels and used by the access point to communicate with a first set of stations, and the second channel bandwidth including the first set of subchannels and a second set of subchannels, and the second channel bandwidth used by the access point to communicate with a second set of stations, identifying, based at least in part on the first indication of the first channel bandwidth and the second indication of the second channel bandwidth, a resource unit of the first channel bandwidth or the second channel bandwidth for the station, and transmitting a trigger-based frame to the access point based at least in part on the identified resource unit.

An apparatus for wireless communication is described. The apparatus may include means for receiving, from an access point, a trigger frame that includes a WLAN common information field, the WLAN common information field including a first indication of a first channel bandwidth and a second indication of a second channel bandwidth, the first channel bandwidth including a first set of subchannels and used by the access point to communicate with a first set of stations, and the second channel bandwidth including the first set of subchannels and a second set of subchannels, and the second channel bandwidth used by the access point to communicate with a second set of stations, means for identifying, based at least in part on the first indication of the first channel bandwidth and the second indication of the second channel bandwidth, a resource unit of the first channel bandwidth or the second channel bandwidth for the station, and means for transmitting a trigger-based frame to the access point based at least in part on the identified resource unit.

Another apparatus for wireless communication is described. The apparatus may include a processor, memory in electronic communication with the processor, and instructions stored in the memory. The instructions may be operable to cause the processor to receive, from an access point, a trigger frame that includes a WLAN common information field, the WLAN common information field including a first indication of a first channel bandwidth and a second indication of a second channel bandwidth, the first channel bandwidth including a first set of subchannels and used by the access point to communicate with a first set of stations, and the second channel bandwidth including the first set of subchannels and a second set of subchannels, and the second channel bandwidth used by the access point to communicate with a second set of stations, identify, based at least in part on the first indication of the first channel bandwidth and the second indication of the second channel bandwidth, a resource unit of the first channel bandwidth or the second channel bandwidth for the station, and transmit a trigger-based frame to the access point based at least in part on the identified resource unit.

A non-transitory computer-readable medium for wireless communication is described. The non-transitory computer-readable medium may include instructions operable to cause a processor to receive, from an access point, a trigger frame that includes a WLAN common information field, the WLAN common information field including a first indication of a first channel bandwidth and a second indication of a second channel bandwidth, the first channel bandwidth including a first set of subchannels and used by the access point to communicate with a first set of stations, and the second channel bandwidth including the first set of subchannels and a second set of subchannels, and the second channel bandwidth used by the access point to communicate with a second set of stations, identify, based at least in part on the first indication of the first channel bandwidth and the second indication of the second channel bandwidth, a resource unit of the first channel bandwidth or the second channel bandwidth for the station, and transmit a trigger-based frame to the access point based at least in part on the identified resource unit.

In some examples of the method, apparatus, and non-transitory computer-readable medium described above, identifying the resource unit of the first channel bandwidth or the second channel bandwidth for the station includes: determining that the resource unit for the station may be in the first channel bandwidth based at least in part on identifying a first value of the second indication of the second channel bandwidth. Some examples of the method, apparatus, and non-transitory computer-readable medium described above may further include processes, features, means, or instructions for determining that the resource unit for the station may be in the second channel bandwidth based at least in part on identifying a second value of the second indication of the second channel bandwidth.

In some examples of the method, apparatus, and non-transitory computer-readable medium described above, the second subfield of the WLAN common information field includes a HE-SIG-A reserved subfield.

In some examples of the method, apparatus, and non-transitory computer-readable medium described above, identifying the resource unit of the first channel bandwidth or the second channel bandwidth for the station includes: decoding a resource unit allocation subfield of the trigger frame. Some examples of the method, apparatus, and non-transitory computer-readable medium described above may further include processes, features, means, or instructions for identifying, based at least in part on the decoded resource unit allocation subfield, the resource unit of the first channel bandwidth or the second channel bandwidth for the station to use to transmit in the trigger-based frame.

In some examples of the method, apparatus, and non-transitory computer-readable medium described above, the resource unit may be in the first channel bandwidth and may be exclusive of the second channel bandwidth. In some examples of the method, apparatus, and non-transitory computer-readable medium described above, the resource unit may be in the second channel bandwidth and may be exclusive of the first channel bandwidth.

In some examples of the method, apparatus, and non-transitory computer-readable medium described above, the first indication of the first channel bandwidth includes a value of a bandwidth subfield of the trigger frame. In some examples of the method, apparatus, and non-transitory computer-readable medium described above, the second indication of the second channel bandwidth includes a value of a second subfield of the WLAN common information field.

In some examples of the method, apparatus, and non-transitory computer-readable medium described above, the first channel bandwidth includes 160 MHz. In some examples of the method, apparatus, and non-transitory computer-readable medium described above, the second channel bandwidth includes 320 MHz.

A method of wireless communication is described. The method may include identifying a first channel bandwidth for a first set of stations to use to communicate with the access point, the first channel bandwidth including a first set of subchannels, identifying a second channel bandwidth for a second set of stations to use to communicate with the access point, the second channel bandwidth including the first set of subchannels and a second set of subchannels, generating a WLAN common information field the includes a first indication of the first channel bandwidth and a second indication of the second channel bandwidth, and transmitting a trigger frame that includes the WLAN common information field.

An apparatus for wireless communication is described. The apparatus may include means for identifying a first channel bandwidth for a first set of stations to use to communicate with the access point, the first channel bandwidth including a first set of subchannels, means for identifying a second channel bandwidth for a second set of stations to use to communicate with the access point, the second channel bandwidth including the first set of subchannels and a second set of subchannels, means for generating a WLAN common information field the includes a first indication of the first channel bandwidth and a second indication of the second channel bandwidth, and means for transmitting a trigger frame that includes the WLAN common information field.

Another apparatus for wireless communication is described. The apparatus may include a processor, memory in electronic communication with the processor, and instructions stored in the memory. The instructions may be operable to cause the processor to identify a first channel bandwidth for a first set of stations to use to communicate with the access point, the first channel bandwidth including a first set of subchannels, identify a second channel bandwidth for a second set of stations to use to communicate with the access point, the second channel bandwidth including the first set of subchannels and a second set of subchannels, generate a WLAN common information field the includes a first indication of the first channel bandwidth and a second indication of the second channel bandwidth, and transmit a trigger frame that includes the WLAN common information field.

A non-transitory computer-readable medium for wireless communication is described. The non-transitory computer-readable medium may include instructions operable to cause a processor to identify a first channel bandwidth for a first set of stations to use to communicate with the access point, the first channel bandwidth including a first set of subchannels, identify a second channel bandwidth for a second set of stations to use to communicate with the access point, the second channel bandwidth including the first set of subchannels and a second set of subchannels, generate a WLAN common information field the includes a first indication of the first channel bandwidth and a second indication of the second channel bandwidth, and transmit a trigger frame that includes the WLAN common information field.

Some examples of the method, apparatus, and non-transitory computer-readable medium described above may further include processes, features, means, or instructions for identifying a resource unit for a station in the second set of subchannels. Some examples of the method, apparatus, and non-transitory computer-readable medium described above may further include processes, features, means, or instructions for transmitting a resource unit allocation subfield in the trigger frame that indicates the identified resource unit in the WLAN common information field.

Some examples of the method, apparatus, and non-transitory computer-readable medium described above may further include processes, features, means, or instructions for receiving, in response to the transmitted trigger frame, a trigger-based frame from at least one of the first set of stations and at least one of the second set of stations, the trigger-based frame including resource units in the first channel bandwidth and resource units in the second channel bandwidth.

In some examples of the method, apparatus, and non-transitory computer-readable medium described above, the resource units in the first channel bandwidth may be exclusive of the second channel bandwidth. In some examples of the method, apparatus, and non-transitory computer-readable medium described above, the resource units in the second channel bandwidth may be exclusive of the first channel bandwidth.

In some examples of the method, apparatus, and non-transitory computer-readable medium described above, the first indication of the first channel bandwidth includes a value of a bandwidth subfield of the WLAN common information field. In some examples of the method, apparatus, and non-transitory computer-readable medium described above, the second indication of the second channel bandwidth includes a value of a second subfield of the WLAN common information field.

In some examples of the method, apparatus, and non-transitory computer-readable medium described above, the second subfield of the WLAN common information field includes a HE-SIG-A reserved subfield.

Details of one or more implementations of the subject matter described in this disclosure are set forth in the accompanying drawings and the description herein. Other features, aspects, and advantages will become apparent from the description, the drawings and the claims. Note that the relative dimensions of the following Figures may not be drawn to scale.

BRIEF DESCRIPTION OF THE DRAWINGS

Like reference numbers and designations in the various drawings indicate like elements.

DETAILED DESCRIPTION

Figure 1:
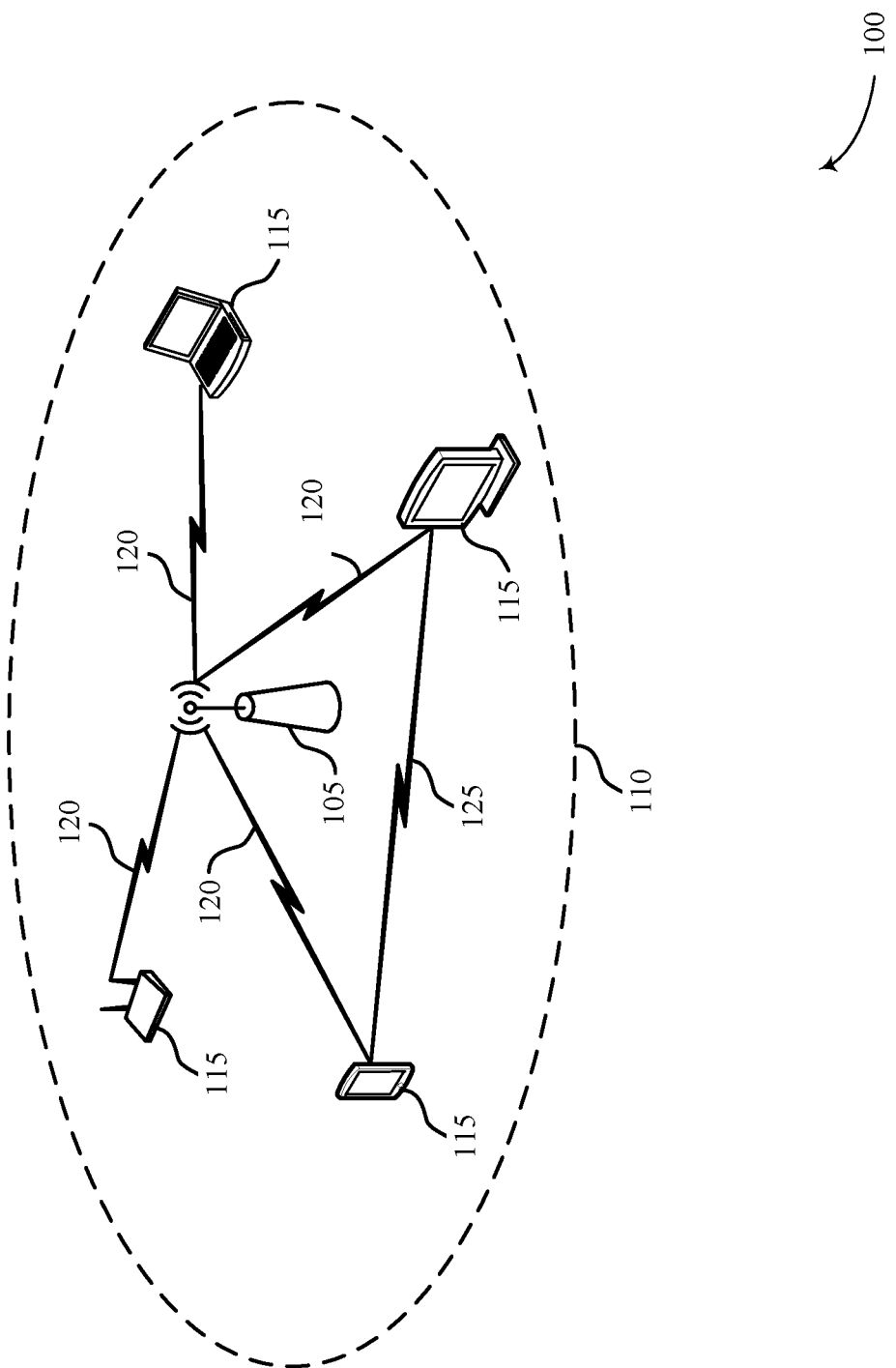
FIG. 1 shows an example of a system for wireless communication that supports multiplexing clients in wireless local area network transmissions.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving radio frequency (RF) signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1xEV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

Techniques are disclosed for an access point (AP) to multiplex wireless stations (STAs) with different capabilities such as utilizing a bandwidth of 160 MHz or 320 MHz, making these wireless stations high efficiency (HE) STAs, or extremely high throughput (EHT) STAs, respectively. According to these techniques, an AP may allocate resources for the EHT STAs in a way in which interference is avoided with the HE STAs. The AP may use a high efficiency signaling A (HE-SIG-A) field to indicate the availability of 320 MHz bandwidth to the 320 MHz STAs. A 320 MHz STA may determine the 320 MHz bandwidth is available and decode a second high efficiency WLAN signaling field (such as a high efficiency signaling B (HE-SIG-B)) on one or both of the 160 MHz resources to obtain scheduling information for each 160 MHz resource. The two 160 MHz bandwidths may be configured independently to allow flexibility for OFDMA configurations. Further, the AP may spoof puncturing of some (such as two) 20 MHz subchannels of an 80 MHz bandwidth to assist in transmitting scheduling information to the HE STAs and EHT STAs.

An AP may multiplex wireless STAs with different capabilities in a single uplink or downlink transmission. For example, some STAs (such as which may be referred to as HE STAs) may be capable of utilizing a bandwidth of 160 MHz including eight 20 MHz channels (which may be referred to as sub-channels) grouped into a primary 80 MHz bandwidth and a secondary 80 MHz bandwidth. Such STAs, referred to as 160 MHz STAs, also may be capable of operating in smaller total bandwidth, such as 80 MHz, 40 MHz, 20 MHz, etc., or in non-contiguous bandwidths, such as in a 80+80 MHz bandwidth operation mode. Other STAs (such as which may be or be referred to as EHT STAs) may be capable of utilizing a bandwidth of up to 320 MHz, including sixteen 20 MHz channels (which may be referred to as sub-channels) grouped into a primary 160 MHz bandwidth and a secondary 160 MHz bandwidth. The primary 160 MHz bandwidth may be the same 160 MHz bandwidth as used by the 160 MHz STAs. The secondary 160 MHz bandwidth may include eight additional 20 MHz channels, grouped into a high 80 MHz bandwidth and a low 80 MHz bandwidth. These type of STAs may be referred to as 320 MHz STAs or 320 MHz devices. As described, 160 MHz devices may use the primary 160 MHz bandwidth, while 320 MHz bandwidth devices may be capable of using both the primary 160 MHz bandwidth and the secondary 160 MHz bandwidth. The AP may allocate resources for the 320 MHz STAs in a way which avoids interfering with resource allocation procedures of 160 MHz STAs.

The AP may transmit downlink information based on a HE multi-user (MU) physical layer conformance procedure (PLCP) protocol data unit (PPDU), referred to as an HE MU PPDU. In a first example, the AP may use a first wireless local area network (WLAN) signaling field (such as a HE-SIG-A field) to indicate the availability of 320 MHz bandwidth to the 320 MHz STAs. The HE-SIG-A field may be decoded by each STA served by the AP and may carry information used to interpret the rest of an HE MU PPDU frame. The AP may indicate to the 320 MHz STA that the 320 MHz bandwidth is available by toggling bits which are unused, reserved, or treated as "don't care" (such as ignored regardless whether a 0 bit value or 1 bit value) by 160 MHz STAs. In some implementations, the AP may signal that the 320 MHz bandwidth is available in orthogonal frequency division multiplexing (OFDM) symbols transmitting during a legacy portion of the WLAN preamble, or another field transmitted prior to the HE-SIG-A field (such as in a legacy signaling (L-SIG) field or repeated L-SIG (RL-SIG) field). A 320 MHz STA may determine the 320 MHz bandwidth is available and decode a second high efficiency WLAN signaling field (such as a HE-SIG-B field) on one or both of the 160 MHz resources to obtain scheduling information for each 160 MHz resource. HE-SIG-B information transmitted on a primary 160 MHz may include scheduling information for the primary 160 MHz, and HE-SIG-B information transmitted on the secondary 160 MHz may include scheduling information for the secondary 160 MHz. The two 160 MHz bandwidths may be configured independently, which may allow flexibility in orthogonal frequency division multiple access (OFDMA) configurations. For example, transmissions for 320 MHz devices may be sent in the second 160 MHz while transmissions for 160 MHz devices may be sent in the primary 160 MHz bandwidth, even though the 160 MHz devices may not be capable for communicating in the second 160 MHz bandwidth. In some implementations, the AP may be restricted from scheduling resources that span from any portion of the primary 160 MHz bandwidth into the second 160 MHz bandwidth.

In some implementations, the AP may spoof puncturing of some (such as two) 20 MHz subchannels of an 80 MHz bandwidth by indicating the subchannels are punctured by an indication in the HE-SIG-A information. However, the AP may transmit HE-SIG-B information scheduling the secondary 160 MHz on the spoofed punctured 20 MHz subchannels. A 160 MHz device may refrain from decoding on the spoofed punctured subchannels, but a 320 MHz device may attempt to decode during the spoofed puncture. If the 320 MHz device successfully decodes the spoofed punctured subchannels, the 320 MHz device may obtain scheduling information for the secondary 160 MHz bandwidth. The AP also may transmit HE-SIG-B information scheduling the primary 160 MHz on the non-punctured 20

MHz subchannels. Both 320 MHz and 160 MHz devices may decode the HE-SIG-B information on the non-punctured 20 MHz channels to obtain scheduling information for the primary 160 MHz. In some implementations, a 320 MHz device may advertise its capabilities to an AP in a management frame (such as a probe response).

Particular implementations of the subject matter described in this disclosure can be implemented to realize one or more of the following potential advantages.

FIG. 1 shows an example of a system for wireless communication that supports multiplexing clients in wireless local area network transmissions. The system may be a WLAN 100 (also known as a Wi-Fi network) configured. The WLAN 100 may include an AP 105 and multiple associated STAs 115, which may represent devices such as wireless communication terminals, including mobile stations, phones personal digital assistant (PDAs), other handheld devices, netbooks, notebook computers, tablet computers, laptops, display devices (such as TVs, computer monitors, etc.), printers, etc. The AP 105 and the associated stations 115 may represent a Basic Service Set (BSS) or an Extended Service Set (ESS). The various STAs 115 in the network are able to communicate with one another through the AP 105. Also shown is a coverage area 110 of the AP 105, which may represent a basic service area (BSA) of the WLAN 100. An extended network station associated with the WLAN 100 may be connected to a wired or wireless distribution system that may allow multiple APs 105 to be connected in an ESS.

A STA 115 may be located in the intersection of more than one coverage area 110 and may associate with more than one AP 105. A single AP 105 and an associated set of STAs 115 may be referred to as a BSS. An ESS is a set of connected BSSs. A distribution system may be used to connect APs 105 in an ESS. In some implementations, the coverage area 110 of an AP 105 may be divided into sectors. The WLAN 100 may include APs 105 of different types (such as metropolitan area, home network, etc.), with varying and overlapping coverage areas 110. Two STAs 115 also may communicate directly via a direct wireless link 125 regardless of whether both STAs 115 are in the same coverage area 110. Examples of direct wireless links 120 may include Wi-Fi Direct connections, Wi-Fi Tunneled Direct Link Setup (TDLS) links, and other group connections. STAs 115 and APs 105 may communicate according to the WLAN radio and baseband protocol for physical and media access control (MAC) layers from IEEE 802.11 and versions including, but not limited to, 802.11b, 802.11g, 802.11a, 802.11n, 802.11ac, 802.11ad, 802.11ah, 802.11ax, 802.11-EHT, etc. In some other implementations, peer-to-peer connections or ad hoc networks may be implemented within WLAN 100.

Devices in wireless communications system 100 may communicate over unlicensed or shared spectrum, which may be a portion of spectrum that includes frequency bands traditionally used by Wi-Fi technology, such as one or more of the 5 GHz band, the 2.4 GHz band, the 60 GHz band, the 3.6 GHz band, and the 900 MHz band. The unlicensed spectrum also may include other frequency bands.

In some implementations, a STA 115 (or an AP 105) may be detectable by a central AP 105, but not by other STAs 115 in the coverage area 110 of the central AP 105. For example, one STA 115 may be at one end of the coverage area 110 of the central AP 105 while another STA 115 may be at the other end. Thus, both STAs 115 may communicate with the AP 105, but may not receive the transmissions of the other. This may result in colliding transmissions for the two STAs 115 in a contention based environment (such as carrier-sense multiple access with collision avoidance (CSMA/CA)) because the STAs 115 may not refrain from transmitting on top of each other. A STA 115 whose transmissions are not identifiable, but that is within the same coverage area 110 may be known as a hidden node. CSMA/CA may be supplemented by the exchange of a request to send (RTS) packet transmitted by a sending STA 115 (or AP 105) and a clear to send (CTS) packet transmitted by the receiving STA 115 (or AP 105). This may alert other devices within range of the sender and receiver not to transmit for the duration of the primary transmission. Thus, RTS/CTS may help mitigate a hidden node problem.

An AP 105 may serve STAs 115 with different capabilities. For example, a first set of STAs 115 may be capable of utilizing a channel bandwidth of 160 MHz, while a second set of STAs 115 may be capable of utilizing a channel bandwidth of 320 MHz. The first set of STAs 115 may utilize a primary 160 MHz of the 320 MHz bandwidth, while the second set of STAs 115 may use the primary 160 MHz and a secondary 160 MHz of the 320 MHz bandwidth. The primary 160 MHz and the secondary 160 MHz may each include eight 20 MHz subchannels. The AP 105 may multiplex OFDMA communications of the first set of STAs 115 with OFDMA communications of the second set of STAs 115. For example, the first set of STAs 115 may receive data on the primary 160 MHz, and the second set of STAs 115 may receive data on the primary 160 MHz or the secondary 160 MHz, or both.

For example, the AP 105 may indicate that a 320 MHz bandwidth channel is available to the second set of STAs 115 in an HE-SIG-A field. The AP 105 may toggle one or more bits in the HE-SIG-A field which are reserved, ignored, or generally unused by the first set of STAs 115, such that the indication of 320 MHz bandwidth does not affect reception of the HE-SIG-A information by the first set of STAs 115. The second set of STAs 115 may decode a second signaling field (such as HE-SIG-B) in both the primary 160 MHz and the secondary 160 MHz to obtain scheduling information for the primary 160 MHz and the secondary 160 MHz respectively. The first set of STAs 115 may decode the HE-SIG-B information in the primary 160 MHz to receive scheduling for the primary 160 MHz.

In some implementations, the AP 105 may spoof puncturing of 20 MHz subchannels of the 160 MHz bandwidth and include an indication that there are punctured 20 MHz subchannels in the HE-SIG-A information. For example, AP 105 may spoof puncturing of two 20 MHz sub-channels. A STA 115 of the first set of STAs 115 may refrain from decoding the spoofed punctured 20 MHz subchannels based on the indication. However, a STA 115 of the second set of STAs 115 may still attempt to decode the spoofed punctured 20 MHz subchannels. The spoofed punctured 20 MHz subchannel may include HE-SIG-B information scheduling resources for the secondary 160 MHz bandwidth. The other 20 MHz subchannels (such as not indicated to be punctured) may include HE-SIG-B information scheduling resources for the primary 160 MHz bandwidth.

Figure 2:
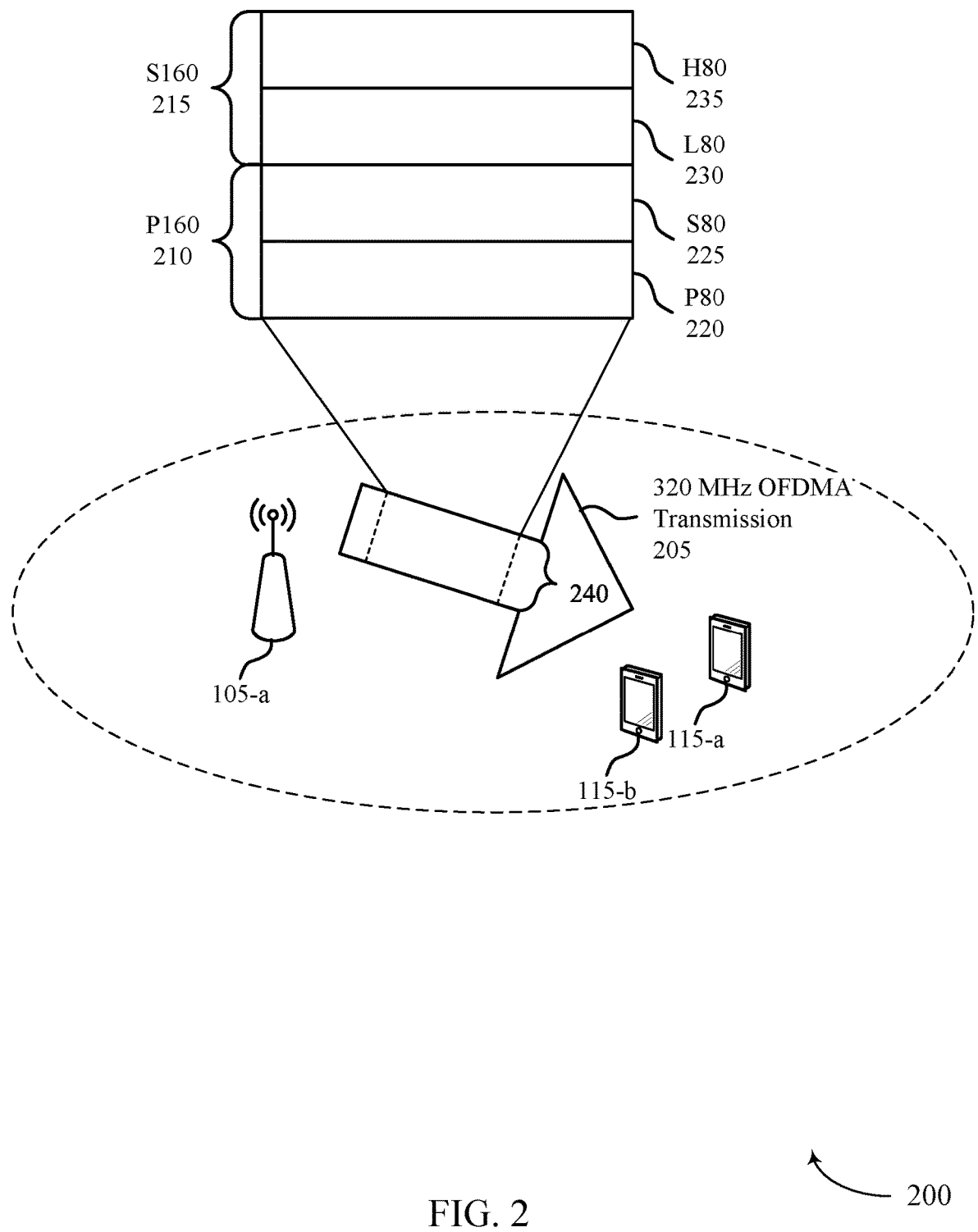
FIG. 2 shows an example of a system for wireless communication that supports multiplexing clients in wireless local area network transmissions.

FIG. 2 shows an example of a system for wireless communication that supports multiplexing clients in wireless local area network transmissions. In some examples, wireless communications system 200 may implement aspects of WLAN 100. Wireless communications system 200 may include AP 105-a, which may be an example of an AP 105 as described herein. Wireless communications system 200 also may include STA 115-a and STA 115-b, which may be examples of STAs 115 as described herein.

Figure 3:
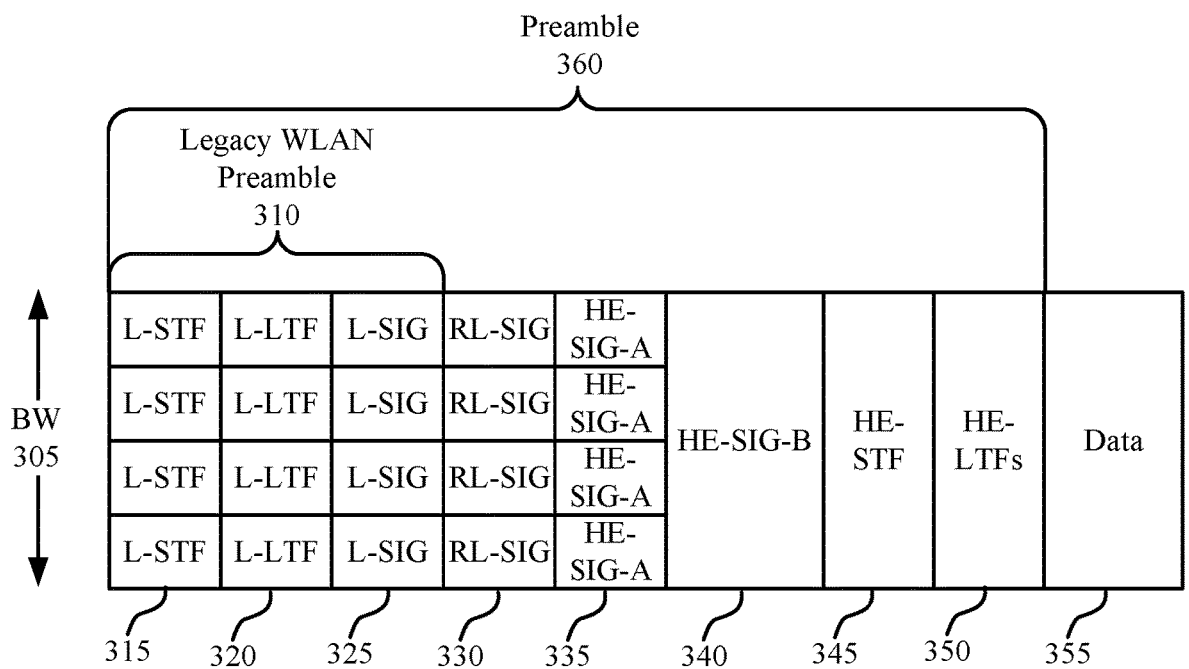
FIG. 3 shows an example of a downlink frame that supports multiplexing clients in wireless local area network transmissions.
Figure 4:
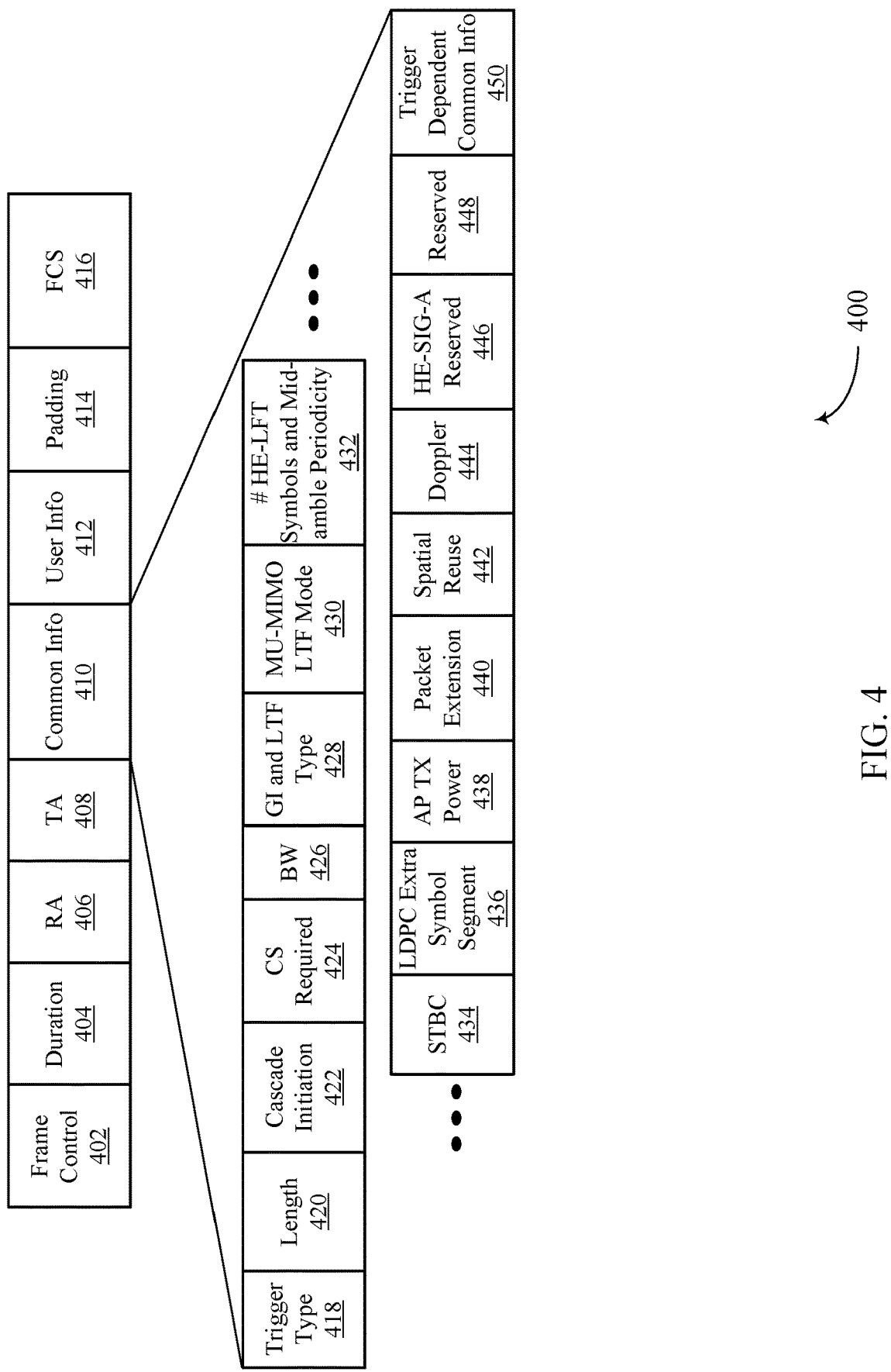
FIG. 4 shows an example of a trigger frame that supports multiplexing clients in wireless local area network transmissions.
Figure 5:
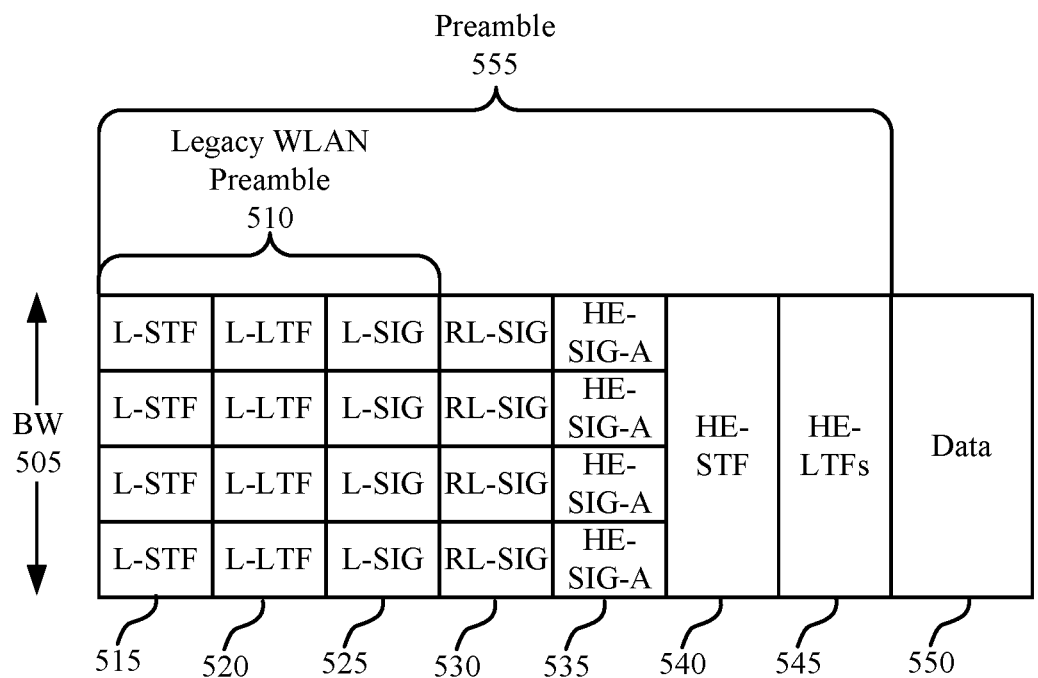
FIG. 5 shows an example of an uplink frame that supports multiplexing clients in wireless local area network transmissions.

The AP 105-*a* may serve multiple STAs 115, including at least STA 115-*a* and STA 115-*b*. In some implementations, the STA 115-*a* may be capable of wireless communication using a channel bandwidth of 320 MHz (such as 320 MHz channel 240). In some examples, the STA 115-*a* may be referred to as an EHT device or a 320 MHz device. The STA 115-*b* may be capable of communications using a channel bandwidth of 160 MHz (such as a primary 160 (P160) MHz, P160 210) and may be referred to as a 160 MHz device. The AP 105-*a* may multiplex 320 MHz devices (such as STA 115-*a*) and 160 MHz devices (such as STA 115-*b*) simultaneously in a 320 MHz downlink OFDMA transmission 205. The 320 MHz downlink OFDMA transmission 205 may include two 160 MHz downlink OFDMA transmissions corresponding to a primary 160 MHz bandwidth, P160 210, and a secondary 160 MHz bandwidth, S160 215. The AP 105-*a* may use an HE MU PPDU format (such as depicted in FIG. 3) for the 320 MHz downlink OFDMA transmission 205 and configure properties for OFDMA transmissions in P160 210 and S160 215 independently. Though not depicted in FIG. 2, techniques described herein are also applicable for uplink OFDMA transmissions using a high efficiency trigger-based PPDU (HE TB PPDU) format (such as illustrated in FIG. 5) in response to a trigger frame (such as depicted in FIG. 4).

The STA 115-*a* may be capable of using P160 210 and S160 215, while the STA 115-*b* may only be capable of using P160 210. P160 210 may include two 80 MHz bandwidths, a primary 80 MHz bandwidth (P80 220) and a secondary 80 MHz bandwidth (S80 225). S160 also may include two 80 MHz bandwidths, including a lower frequency 80 MHz bandwidth (L80 230) and a higher frequency 80 MHz bandwidth (H80 235). Each 80 MHz bandwidth may include four 20 MHz subchannels. For example, P80 220 may include 20 MHz subchannels 1, 2, 3 and 4.

In some implementations, the STA 115-*a* may be limited to using one 160 MHz resource of the 320 MHz bandwidth at a time, for example P160 210 during a first time period, or S160 215 during a second time period.

The AP 105-*a* may allocate resource units for the STA 115-*a* and the STA 115-*b* in the 320 MHz downlink OFDMA transmission 205. The AP 105-*a* may transmit an indication in the P80 220 that the 320 MHz channel 240 is available, including indicating the presence of S160 215. The STA 115-*a* may utilize the wider bandwidth to improve throughput. The AP 105-*a* may implement techniques to avoid disrupting resource allocation for the STA 115-*b* when indicating the larger bandwidth, as the STA 115-*b* may be unable to utilize the full 320 MHz bandwidth.

According to the HE MU PPDU format, the AP 105-*a* may transmit a preamble, which includes an HE-SIG-A on each 20 MHz subchannel of the 320 MHz downlink OFDMA transmission 205. The HE-SIG-A may carry information which receiving STAs 115 use to interpret the rest of the HE MU PPDU. For example, the HE-SIG-A may indicate the frame format, including locations of HE-SIG-B fields, available channel bandwidths, modulation and coding scheme (MCS), etc.

In some implementations, the AP 105-*a* may include an indication that the 320 MHz bandwidth is available to the STA 115-*a* in the HE-SIG-A. The STA 115-*a* may decode HE-SIG-A in P80 220, in either each subchannel of P80 220 or at least one of them. In some implementations, the HE-SIG-A in P80 220 may include a bit signaling the 320 MHz channel 240 for OFDMA signaling. In some implementations, the STA 115-*b* may ignore, be unaware of, or unable to detect the bit which signals the 320 MHz channel 240. For example, the STA 115-*b* may be configured to treat the bit indicating the 320 MHz channel 240 as a "don't care." In some other examples, the AP 105-*a* may indicate there is 320 MHz OFDM available through signaling in OFDM symbols prior to the HE-SIG-A (such as through legacy preamble fields, RL-SIG, etc.). The STA 115-*a* may decode HE-SIG-B information in S160 215 (such as and in P160 210 in some examples) after identifying the indication included in the HE-SIG-A information. The HE-SIG-B information in S160 215 may include resource allocation information for the STA 115-*a* in S160 215. In some implementations, the STA 115-*a* also may receive HE-SIG-B information in P80 220 including resource allocation information for P160 210.

In some other examples the AP 105-*a* may spoof puncturing two 20 MHz subchannels of P80 220. An HE-SIG-A field in P80 220 may indicate that the bandwidth is 160 MHz and 20 MHz subchannels 3 and 4 are punctured. The STA 115-*b* may decode HE-SIG-A and HE-SIG-B in P80 220 in 20 MHz subchannels 1 and 2, as 20 MHz subchannels 3 and 4 are indicated as punctured. The STA 115-*a* may decode HE-SIG-A and HE-SIG-B on each 20 MHz subchannel in P80 220, despite the indication that 20 MHz subchannels 3 and 4 are punctured. The AP 105-*a* may transmit an HE-SIG-A and HE-SIG-B applicable to 320 MHz devices on 20 MHz subchannels 3 and 4 of P80 220. An HE-SIG-B transmitted on spoofed punctured channels may indicate resource allocations in S160 215. The STA 115-*a* may be indicated resource allocations for P160 210 via HE-SIG-B information transmitted in 20 MHz subchannels 1 and 2.

Techniques described enable the AP 105-*a* to indicate 320 MHz bandwidth to the STA 115-*a* while continuing to support resource allocations to the STA 115-*b* in the primary 160 MHz (which may be the supported channel bandwidth of the STA 115-*b*). HE-SIG-A information may indicate a bandwidth of 160 MHz (such as P160 210 including P80 220 and S80 225) to the STA 115-*b*. The STA 115-*b* may decode HE-SIG-A in two 20 MHz subchannels of P80 220, or in each 20 MHz subchannel of P80 220. The STA 115-*b* also may decode HE-SIG-B in either each subchannel of P80 220 or at least two subchannels of P80 220. The STA 115-*b* may decode HE-SIG-B based on a [1,2,1,2] structure or a [1,2,3,4] structure, as further described with reference to FIGS. 7 and 8, respectively. The HE-SIG-B may include resource allocation information for P160 210.

The STA 115-*a* may advertise its capabilities to AP 105-*a* in a management frame (such as a probe response). In some implementations, the STA 115-*a* may indicate its ability to participate in 160 MHz OFDMA in S160 in 320 MHz (such as S160In320 MHz). Additionally, or alternatively, the STA 115-*a* may indicate its ability to participate in 160 MHz OFDMA in P160 in 320 MHz (such as P160In320 MHz).

FIG. 3 shows an example of a downlink frame 300 that supports multiplexing clients in wireless local area network transmissions. In some examples, the downlink frame 300 may implement aspects of WLAN 100.

The downlink frame 300 may include a legacy WLAN preamble 310, an RL-SIG field 330, a first WLAN signaling field 335 (such as an HE-SIG-A), a second WLAN signaling field 340 (such as an HE-SIG-B), a WLAN high efficiency short training field (HE-STF) 345, at least one high efficiency long training field (HE-LTF) 350, and a data field 355. HE-STF 345 and HE-LTF 350 may be transmitted for stations on resource units corresponding to the resource units allocated for the stations in the data field 355. The downlink frame 300 may include two segments: a preamble 360 and the data field 355. The preamble 360 may include information used by a receiving device (such as a STA 115) to identify, interpret, and receive the data field 355.

In some examples, the fields may be transmitted in the following order: legacy WLAN preamble 310, followed by RL-SIG field 330, first WLAN signaling field 335, second WLAN signaling field 340, HE-STF 345, HE-LTFs 350, data field 355. In some implementations, the first WLAN signaling field 335 may be referred to as an HE-SIG-A field, and the second WLAN signaling field 340 may be referred to as an HE-SIG-B field.

The downlink frame 300 may be transmitted over a radio frequency spectrum band 305, which in some examples may include a set of sub-bands or subchannels. In some examples, the radio frequency spectrum band may have a bandwidth of 80 MHz, and each of the subchannels may have a bandwidth of 20 MHz. In some implementations, the radio frequency spectrum band 305 may be similar to P80 220 of FIG. 2, which may be a primary 80 MHz of a 320 MHz total bandwidth. In some other examples, the radio frequency spectrum band 305 may be a total bandwidth of 160 MHz having eight 20 MHz subchannels or 320 MHz having sixteen 20 MHz subchannels. In such cases, fields of the preamble 360 may be repeated over the increased bandwidths to span the increased bandwidth.

The legacy WLAN preamble 310 may include at least one of legacy STF (L-STF) information 315, legacy LTF (L-LTF) information 320, and L-SIG information 325. When the radio frequency spectrum band includes a plurality of sub-bands, the L-STF, L-LTF, and L-SIG information may be duplicated and transmitted in each of the sub-bands. The L-SIG information 325 may be further duplicated and transmitted in each sub-band of the legacy WLAN preamble 310 as RL-SIG information.

The first WLAN signaling field 335 may include high efficiency WLAN signaling information usable by STAs 115 to interpret other downlink transmissions in the downlink frame 300. The first WLAN signaling field 335 also may include information usable by the STAs 115 to decode the second WLAN signaling field 340. When the radio frequency spectrum band includes a plurality of sub-bands, the information (such as HE-SIG-A information) included in the first WLAN signaling field 335 may be duplicated and transmitted in each sub-band of the first WLAN signaling field 335. For example, the HE-SIG-A information may indicate an MCS of the second WLAN signaling field 340, a dual carrier modulation (DCM) format of the second WLAN signaling field 340, and a bandwidth of the second WLAN signaling field 340.

In some implementations, the HE-SIG-A information may include an indication of availability of 320 MHz OFDM resources to a 320 MHz device (such as STA 115-a of FIG. 2). The HE-SIG-A information may indicate locations of HE-SIG-B fields, where the HE-SIG-B fields carry scheduling information for the primary 160 MHz bandwidth or secondary 160 MHz bandwidth. In some implementations, some bits in the HE-SIG-A field may be ignored, reserved, or treated as "don't care" bits by 160 MHz devices under certain configurations. For example, if the MCS bit field in the HE-SIG-A indicates MCS2 or MCS5 for HE-SIG-B, a 160 MHz device may treat the DCM field as "don't care" (such as non-applicable). Therefore, the DCM field may be used to indicate 320 MHz bandwidth with an MCS of 2 or 5. Other examples may be applicable, where a bit in the HE-SIG-A information is used to indicate 320 MHz bandwidth when that bit is ignored, disregarded, discarded, etc. by 160 MHz STAs 115.

The second WLAN signaling field 340 may include high efficiency WLAN signaling information (such as HE-SIG-B information) usable by the STAs 115 configured to receive downlink communications in the downlink frame 300. More specifically, the second WLAN signaling field 340 may include information usable by the STAs 115 to decode data received in the data field 355. The second WLAN signaling field 340 may be encoded separately from the first WLAN signaling field 335. HE-SIG-B may provide OFDMA and downlink multiple-user, multiple-input, multiple-output (MU-MIMO) resource allocation information to allow the STAs 115 to look up the corresponding resources in the data field 355 of the downlink frame 300. HE-SIG-B information transmitted on the primary 160 MHz bandwidth may include scheduling information for the P160 MHz bandwidth, and HE-SIG-B information transmitted on the secondary 160 MHz bandwidth may include scheduling information for the S160 MHz bandwidth. In the case of spoofed puncturing, spoofed punctured channels of the primary 160 MHz bandwidth may be carry HE-SIG-B information including resource allocation information for the secondary 160 MHz bandwidth.

FIG. 4 shows an example of a trigger frame 400 that supports multiplexing clients in wireless local area network transmissions. In some examples, the trigger frame 400 may implement aspects of WLAN 100.

An AP 105 may transmit the trigger frame 400 to trigger uplink transmission from a STA 115. The trigger frame 400 may solicit and allocate resources for an HE TB PPDU transmission from a STA 115. The trigger frame 400 may include other information which the triggered STA 115 uses to transmit the HE TB PPDU. A STA 115 may transmit an uplink frame 500 (such as the HE TB PPDU) of FIG. 5 in response to receiving the trigger frame 400.

The trigger frame 400 may include a number of different fields, including a frame control field 402, a duration field 404, a recipient address field 406, a transmitter address field 408, a common info field 410, a user info field 412, padding 414, and a frame check sequence (FCS) field 416. The common info field 410 may include a further number of fields, such as a trigger type field 418, a length field 420, a cascade initiation field 422, a carrier sense required field 424, a bandwidth field 426, a guard interval (GI) and LTF type field 428, a MU-MIMO LTF mode field 430, a number of HE-LTF symbols and mid-amble periodicity field 432, a space-time block code field 434, a low-density parity-check (LDPC) extra symbol segment field 436, an AP transmit power field 438, a packet extension field 440, a spatial reuse field 442, a doppler field 444, an HE-SIG-A reserved field 446, a reserved field 448, and a trigger dependent common info field 450.

In some implementations, the trigger frame 400 may indicate (such as in the bandwidth field 426) a bandwidth of 160 MHz for 160 MHz STAs 115. 320 MHz STAs 115 also may be allocated resource units in a first 160 MHz such as P160 210 of FIG. 2.

In some implementations, a bandwidth of 320 MHz and 320 MHz OFDMA resource unit properties for capable devices may be indicated in the trigger frame 400. One bit may be used to indicate the 320 MHz bandwidth. For example, a bit in the HE-SIG-A reserved field 446 may be used to indicate 320 MHz bandwidth. If the bit is set to 0, there may be 320 MHz bandwidth available. Otherwise, there may not be 320 MHz bandwidth available. In some implementations, 160 MHz STAs 115 may ignore the bit set to indicate 320 MHz bandwidth (such as interpret the bit as "don't care").

FIG. 5 shows an example of an uplink frame 500 that supports multiplexing clients in wireless local area network transmissions. In some examples, the uplink frame 500 may implement aspects of WLAN 100.

A STA 115 may receive a trigger frame (such as a trigger frame 400 of FIG. 4) to trigger multi-user uplink transmission. In some implementations, the common info field of the trigger frame may indicate when to transmit the uplink frame 500 (such as an HE TB PPDU) and the duration of the payload (such as corresponding to the size of a data field 550). The trigger frame may include other information the STA 115 uses to transmit the uplink frame 500 in response. A 320 MHz STA 115 may determine there is 320 MHz bandwidth available for OFDMA transmission based on information in the common info field as described herein. The 320 MHz STA 115 may transmit the uplink frame 500 in at least a portion of one or two 160 MHz channels, such as S160 or P160 as described in FIG. 2. The uplink frame 500 may include two segments: a preamble 555 and the data field 550. The preamble 555 may include information used by a receiving device (such as an AP 105) to identify, interpret, and receive the data field 550.

The uplink frame 500 may include some of the same fields as the downlink frame 300 of FIG. 3. For example, the uplink frame 500 may include a legacy WLAN preamble field 510, including an L-STF field 515, an L-LTF field 520, and an L-SIG field 525. The uplink frame 500 may further include an RL-SIG field 530, which may be a repetition of the L-SIG field 525.

The uplink frame 500 may include an HE-SIG-A field 535, which may carry HE-SIG-A information as described herein. The uplink frame 500 also may include an HE-STF field 540 and a number of (such as one or more) HE-LTF fields 545. The uplink frame 500 also may include data field 550 for uplink data.

In some implementations, the pre-HE modulated fields, including L-STF field 515, L-LTF field 520, L-SIG field 525, RL-SIG field 530, and HE-SIG-A field 535, may be sent on one 20 MHz channel where the STA's HE modulated fields are located. If the HE modulated fields are located in more than one 20 MHz channel, the pre-HE modulated fields may be duplicated over the multiple 20 MHz channels (such as a channel bandwidth 505). For example, a STA 115 may duplicate the pre-HE modulated fields over 20 MHz channels in P80, S80, S160, or P160 as described with reference to FIG. 2, based on which resources are allocated to the STA 115.

Figure 6:
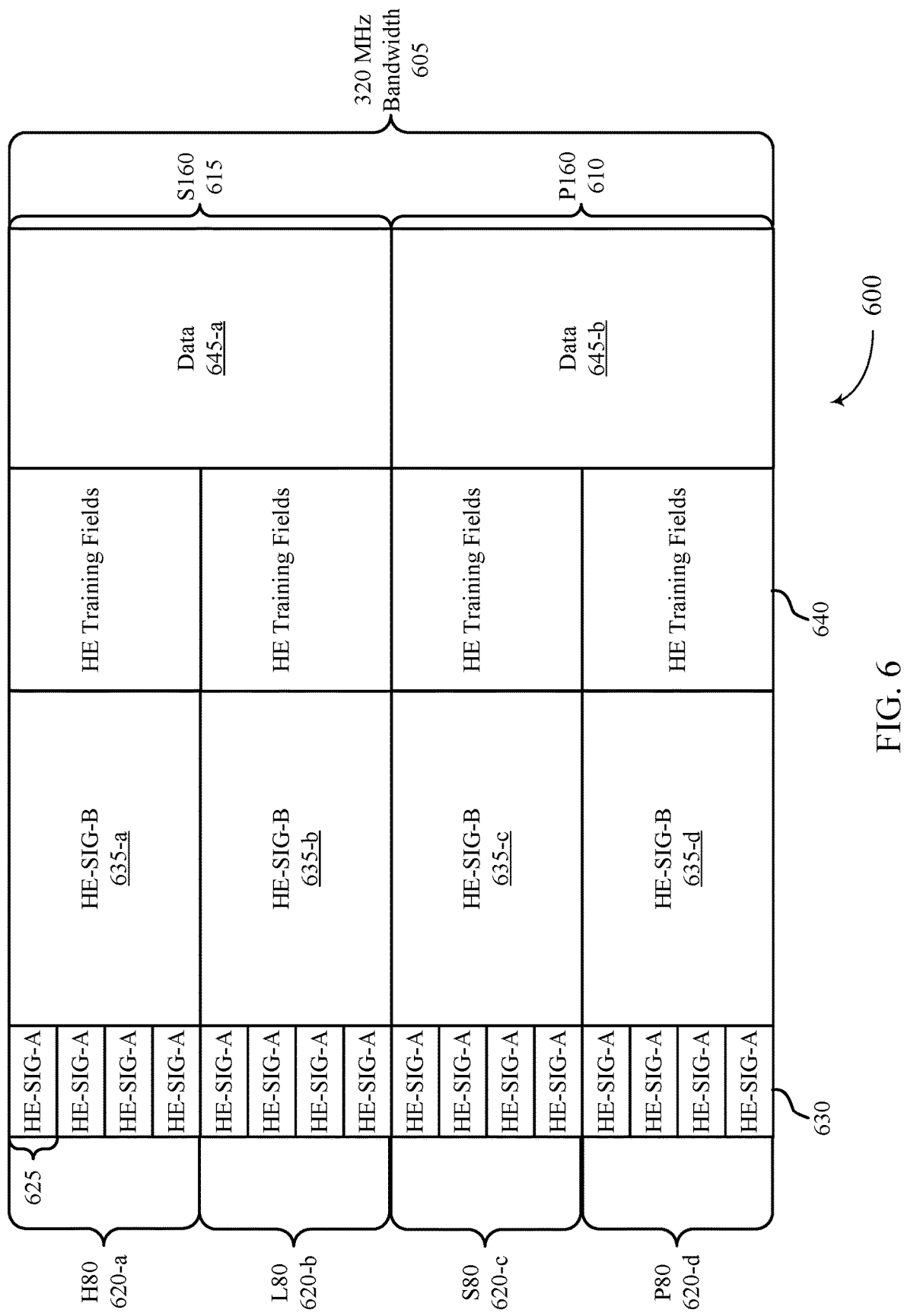
FIG. 6 shows an example of a 320 MHz downlink channel configuration that supports multiplexing clients in wireless local area network transmissions.

FIG. 6 shows an example of a 320 MHz downlink channel configuration 600 that supports multiplexing clients in wireless local area network transmissions. In some examples, 320 MHz downlink channel configuration 600 may implement aspects of WLAN 100.

The 320 MHz downlink channel configuration 600 illustrates a downlink frame with an HE MU PPDU format transmitted in a 320 MHz channel 605. Techniques described herein also may be applicable to an uplink frame with an HE TB PPDU format.

A 320 MHz channel 605 may include a number of smaller bandwidth resources. For example, the 320 MHz channel 605 may include two 160 MHz bandwidths, P160 610 and S160 615. P160 610 and S610 615 may be respective examples of a P160 210 and an S160 215 as described in FIG. 2. P160 610 may further include P80 620-d and S80 620-c, which may be respective examples of a P80 220 and S80 225 as described in FIG. 2. S160 may include L80 620-b and H80 620-a, which may be examples of an L80 230 and H80 235 as described in FIG. 2. Each 80 MHz bandwidth 620 may include four 20 MHz subchannels 625.

An AP 105 may transmit HE-SIG-A information in an HE-SIG-A field 630. The HE-SIG-A information may be usable by other APs 105 and STAs 115 to receive or transmit communications on at least a portion of the 320 MHz channel 605. For example, a 320 MHz device may use the HE-SIG-A information to interpret communications on S160 615. Additionally, or alternatively, a 160 MHz device may use the HE-SIG-A information to interpret communications on P80 620-d. The HE-SIG-A information may be duplicated and transmitted in each subchannel 625 of the HE-SIG-A field 630.

The HE-SIG-B field 635 may carry HE-SIG-B information, usable by APs 105 or STAs 115 identified to transmit or receive communications on at least a portion of the 320 MHz channel 605. More specifically, the HE-SIG-B information indicates how APs 105 or STAs 115 transmit/encode or receive/decode data in the data fields 645. The HE-SIG-B field 635 may be encoded separately from the HE-SIG-A field 630. HE-SIG-B information may include a common block field that signals information to a group of devices, such as HE STAs (such as including 320 MHz devices and 160 MHz devices) within range of an AP 105, and user blocks, each of which signals information specific to a STA 115 of the group of devices. The common block may include a resource allocation field that signals how the data fields 645 are partitioned among devices (such as partitions the data field into resource units). The HE-SIG-B information may provide OFDMA and DL MU-MIMO resource allocation information for a STA 115, which enables the STA 115 to look up the corresponding resources in the data fields 645.

The HE training fields 640 may include HE-STFs and HE-LTFs. For example, the HE training fields 640 may include one HE-STF and one or more HE-LTFs. The HE-STFs may be used to improve automatic gain control estimation in a MIMO transmission. The one or more HE-LTFs may provide information for the receiver to estimate a MIMO channel between a set of constellation mapper outputs (or, if space-time block code (STBC) is applied, the STBC encoder outputs) and the receive chains. The data fields 645 may include data scheduled for one or more STAs 115.

For example, a 320 MHz device (such as an EHT-capable STA) may receive HE-SIG-A information in HE-SIG-A field 630 of P80 620-d. In some implementations, the HE-SIG-A information may include an indication (such as described in FIG. 3) that OFDMA transmission is available on the P160 610, on the S160 615, or both. In some implementations, the HE-SIG-A information may indicate to the 320 MHz STA 115 to decode HE-SIG-B fields 635 in S160 615 or P160 610. In some implementations, the 320 MHz STA 115 may decode an HE-SIG-B 635 in a 160 MHz resource (such as P160 610 or S160 615) if an HE-SIG-A field 630 indicates the 320 MHz device is being scheduled for that 160 MHz resource. For example, if the HE-SIG-A field indicates there is scheduling in S160 615 but not P160 610, the 320 MHz STA 115 may decode HE-SIG-B 635-a, HE-SIG-B 635-b, or both, and the 320 MHz STA 115 may not decode HE-SIG-B 635-c or HE-SIG-B 635-d. In some implementations, the 320 MHz STA 115 may be limited to decoding an HE-SIG-B 635 in either P160 610 or S160 615, but not both.

The 320 MHz STA 115 may decode HE-SIG-B fields 635-a, 635-b, 635-c, and 635-d. The 320 MHz STA 115 may identify resource units in data field 645-a and 645-b allocated for downlink transmission. The 320 MHz STA 115 may identify resource units in data field 645-a based on HE-SIG-B fields 635-*a* and 635-*b*, and the 320 MHz STA 115 may identify resource units in data field 645-*b* based on HE-SIG-B fields 635-*c* and 635-*d*. The 320 MHz STA 115 may receive data in data fields 645-*a* and 645-*b*. In this example, a 160 MHz STA 115 may decode the HE-SIG-A fields 630 in P80 620-*d* and decode HE-SIG-B information in HE-SIG-B field 635-*d*. The 160 MHz STA 115 may be scheduled resources in data field 645-*d* based on the HE-SIG-B field 635-*d*. The indication of the 320 MHz bandwidth may be included in the HE-SIG-A information as to not interfere with scheduling of 160 MHz devices.

In some implementations, the HE-SIG-A information may indicate that two 20 MHz subchannels 625 of P80 620-*d* are punctured. A 160 MHz STA 115 may refrain from decoding the punctured subchannels carrying HE-SIG-B information in HE-SIG-B field 635-*d*, but a 320 MHz STA 115 may still decode the punctured subchannels. In some implementations, an AP 105 may spoof puncturing of the 20 MHz subchannels 625 and transmit HE-SIG-B information scheduling resource units for 320 MHz OFDMA on the spoofed punctured subchannels. The spoofed punctured subchannels may carry HE-SIG-B information indicating resource units in S160 615. The 320 MHz STA 115 may identify the resource units and receive data in data field 645-*a* in the scheduled resource units. The 320 MHz STA 115 may still decode the non-punctured 20 MHz subchannels 625, which may carry scheduling information for P160 610. By spoofing puncture of the 20 MHz subchannels 625, the 160 MHz STA 115 may not be affected by 320 MHz OFDMA scheduling, as the 160 MHz STA 115 may not decode the spoofed punctured subchannels carrying the 320 MHz resource allocation information.

Figure 7:
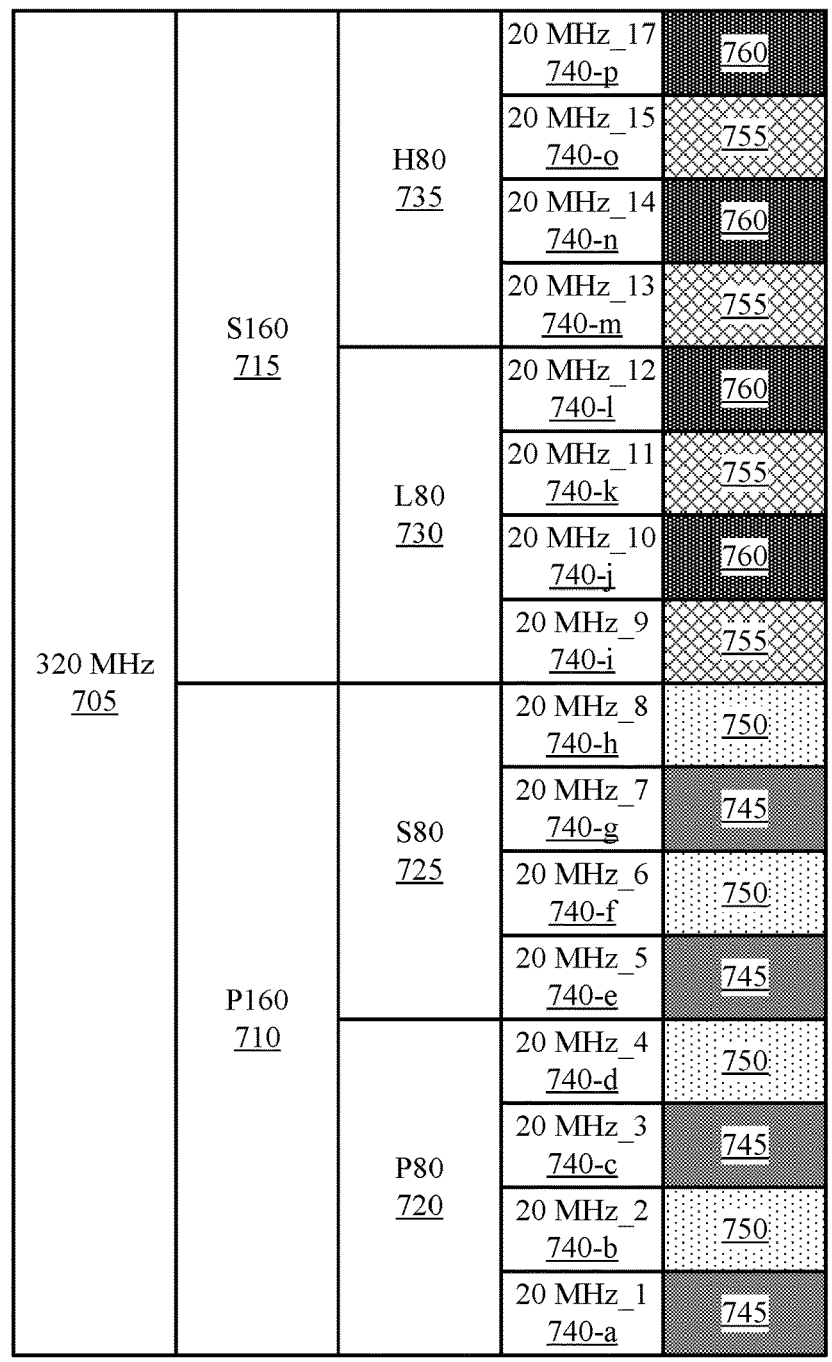
FIGS. 7-8 show examples of high efficiency signaling B (HE-SIG-B) configurations that support multiplexing clients in wireless local area network transmissions.
Figure 7:
Figure 7:
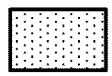
Figure 7:
Figure 7:
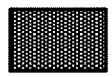

FIG. 7 shows an example of a HE-SIG-B configuration 700 that supports multiplexing clients in wireless local area network transmissions. In some examples, HE-SIG-B configuration 700 may implement aspects of WLAN 100.

The HE-SIG-B configuration 700 may include a 320 MHz channel 705, which may be used for OFDMA communications according to an HE MU PPDU format. The 320 MHz channel 705 may include two 160 MHz bandwidths, P160 710 and S160 715. In some implementations, 320 MHz STAs 115 may be capable of OFDMA communications in both 160 MHz bandwidths. 160 MHz STAs 115 may be capable of OFDMA communications in only P160 710. An AP 105 may multiplex 320 MHz STAs 115 and 160 MHz STAs 115 in 320 MHz OFDMA transmissions. For example, the AP 105 may allocate resources in P160 710 to 160 MHz STAs 115 and allocate resources in P160 710 or S160 715, or both 160 MHz bandwidths, to 320 MHz STAs 115. Each 160 MHz bandwidth may further include two 80 MHz bandwidths. For example, P160 710 may include P80 720 and S80 725. S160 715 may include L80 730 and H80 735.

Each 80 MHz bandwidth may include four 20 MHz subchannels 740. P80 720 may include 20 MHz subchannels 740-*a*, 740-*b*, 740-*c*, and 740-*d*. S80 725 may include 20 MHz subchannels 740-*e*, 740-*f*, 740-*g*, and 740-*h*. L80 730 may include 20 MHz subchannels 740-*i*, 740-*j*, 740-*k*, and 740-*l*. H80 735 may include 20 MHz subchannels 740-*m*, 740-*n*, 740-*o*, and 740-*p*. As described herein, a preamble (such as including a legacy WLAN preamble, an RL-SIG field, and HE-SIG-A information) may be duplicated and transmitted on each 20 MHz subchannel 740.

HE-SIG-B information may be transmitted based on a [1, 2, 1, 2] structure. That is, P160 HE-SIG-B #1 745 may carry the same information on 20 MHz subchannels 740-*a*, 740-*c*, 740-*e*, and 740-*g*. P160 HE-SIG-B #2 750 may carry the same information on 20 MHz subchannels 740-*b*, 740-*d*, 740-*f*, and 740-*h*. P160 HE-SIG-B #1 may include user blocks for a first set of STAs 115, and HE-SIG-B #2 may include user blocks of a second set of STAs 115. The user blocks may include resource allocation information to assist the STAs 115 in identifying resources in a data field. Transmitting HE-SIG-B duplicates may increase the likelihood that the HE-SIG-B information is received. For example, if there is poor channel quality on 20 MHz subchannel 740-*b*, a group of STAs 115 corresponding to P160 HE-SIG-B #2 750 may still receive HE-SIG-B information on 20 MHz subchannel 740-*d*.

In some implementations, an AP 105 may transmit an indication that 320 MHz bandwidth is available for OFDMA transmission. The AP 105 may include the indication in HE-SIG-A information. For example, the AP 105 may transmit the HE-SIG-A information on each 20 MHz subchannel 740 of P80 720. The indication may be an explicit indication as described in FIG. 3. For example, if the MCS bit field in the HE-SIG-A indicates MCS2 or MCS5 for HE-SIG-B in P80 720, a 160 MHz STA 115 may treat the DCM field as "don't care" (such as non-applicable). Therefore, the DCM field may be used to indicate 320 MHz bandwidth when HE-SIG-B is indicated to use MCS 2 or MCS 5. Other examples may be applicable, where a bit in HE-SIG-A information is used to indicate 320 MHz bandwidth when that bit is ignored, reserved, disregarded, discarded, etc. by 160 MHz devices.

In this example, a 320 MHz STA 115 may identify the 320 MHz bandwidth and decode HE-SIG-B information indicated by the HE-SIG-A. In some implementations, the 320 MHz STA 115 may decode HE-SIG-B information in both S160 715 and P160 710. For example, the 320 MHz STA 115 may decode any one or more of P160 HE-SIG-B #1 745, P160 HE-SIG-B #2 750, S160 HE-SIG-B #1 755, and S160 HE-SIG-B #2 760. HE-SIG-B information transmitted in P160 710 may allocate resources in P160 710, and HE-SIG-B information transmitted in S160 715 may allocate resources in S160 715. That is, resource scheduling for P160 710 and S160 715 may be handled independently. Therefore, properties of OFDMA transmissions in each of the 160 MHz bandwidths may be configured independently. For example, 320 MHz STAs 115 scheduled in S160 715 may use half of or a quarter of an OFDM data symbol duration compared to a P160 OFDM data symbol duration.

A 160 MHz STA 115 also may receive the HE-SIG-A information, but the indication of the 320 MHz bandwidth may not affect the 160 MHz STA's interpretation of the rest of the HE MU PPDU frame. The 160 MHz STA 115 may decode HE-SIG-B information in P80 720 to identify resource allocation information for P160 710. For example, the 160 MHz STA 115 may decode P160 HE-SIG-B #1 745 or P160 HE-SIG-B #2 750, or both. The 160 MHz STA 115 may decode data in a data field of P160 710 according to the resource allocation information. Thus, the AP 105 may multiplex 320 MHz STAs 115 and 160 MHz STAs 115 without adversely affecting scheduling for the 160 MHz STAs 115.

Figure 8:
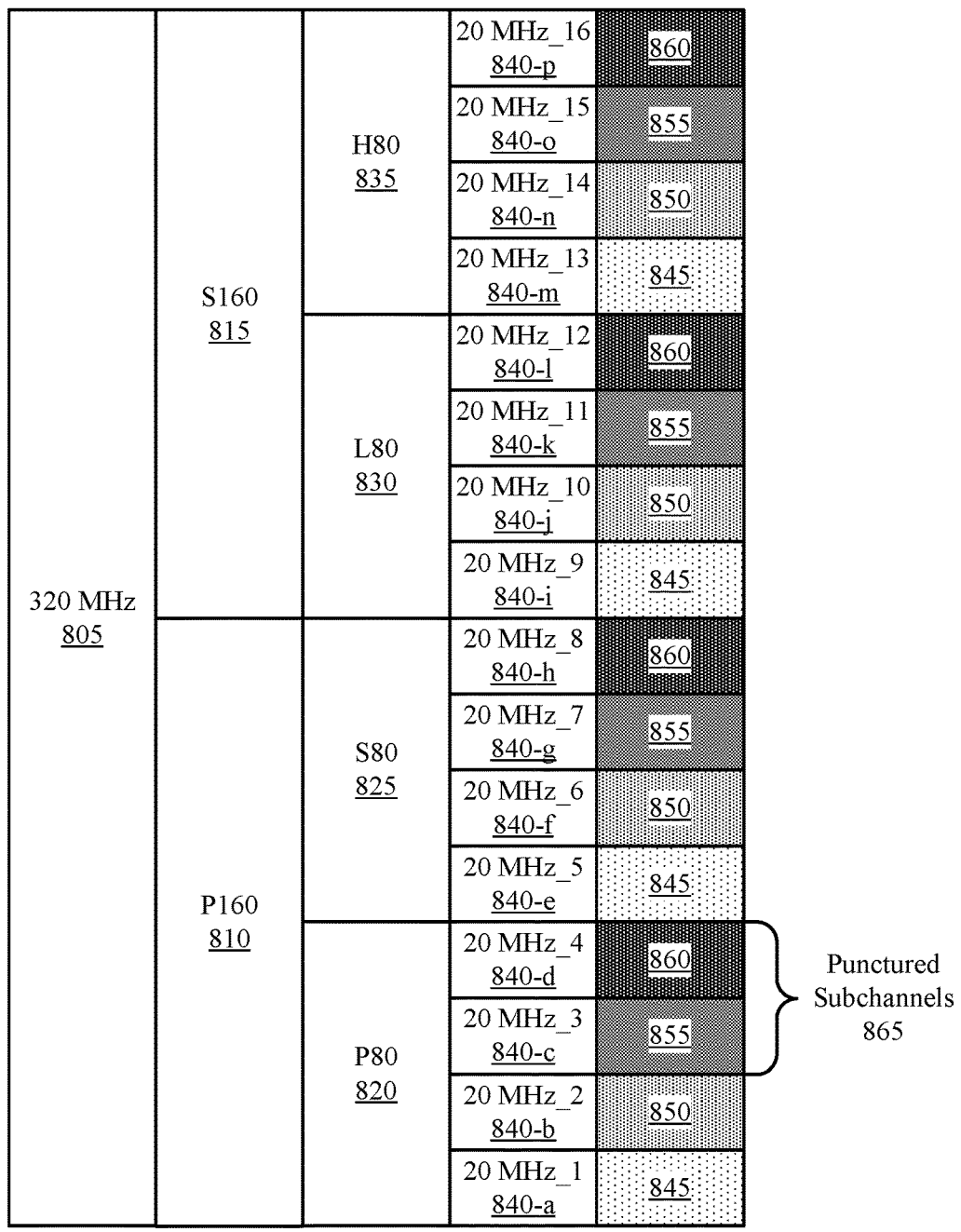

FIG. 8 shows an example of a HE-SIG-B configuration 800 that supports multiplexing clients in wireless local area network transmissions. In some examples, HE-SIG-B configuration 800 may implement aspects of WLAN 100.

The HE-SIG-B configuration 800 may include a 320 MHz channel 805, which may be used for OFDMA communications according to an HE MU PPDU format. The 320 MHz channel 805 may include two 160 MHz bandwidths, P160 810 and S160 815. In some implementations, 320 MHz STAs 115 may be capable of OFDMA communications in both 160 MHz bandwidths. 160 MHz STAs 115 may be capable of OFDMA communications in only P160 810. An AP 105 may multiplex 160 MHz STAs 115 and 160 MHz STAs 115 in 320 MHz OFDMA transmissions. For example, the AP 105 may allocate resources in P160 810 to 160 MHz STAs 115 and allocate resources in P160 810 or S160 815, or both 160 MHz bandwidths, to 320 MHz STAs 115. Each 160 MHz bandwidth may further include two 80 MHz bandwidths. For example, P160 810 may include P80 820 and S80 825. S160 815 may include L80 830 and H80 835.

Each 80 MHz resource may include four 20 MHz subchannels 840. P80 820 may include 20 MHz subchannels 840-*a*, 840-*b*, 840-*c*, and 840-*d*. S80 825 may include 20 MHz subchannels 840-*e*, 840-*f*, 840-*g*, and 840-*h*. L80 830 may include 20 MHz subchannels 840-*i*, 840-*j*, 840-*k*, and 840-*l*. H80 835 may include 20 MHz subchannels 840-*m*, 840-*n*, 840-*o*, and 840-*p*. As described herein, a legacy WLAN preamble and HE-SIG-A information may be duplicated and transmitted on each 20 MHz subchannel 840.

HE-SIG-B information may be transmitted based on a [1, 2, 3, 4] structure. That is, HE-SIG-B #1 845 may carry the same information on 20 MHz subchannels 840-*a*, 840-*e*, 840-*i*, and 840-*m*. Similarly, HE-SIG-B #2 850 may carry the same information on 20 MHz subchannels 840-*b*, 840-*f*, 840-*j*, and 840-*n*, HE-SIG-B #3 850 may carry the same information on 20 MHz subchannels 840-*c*, 840-*g*, 840-*k*, and 840-*o*, and HE-SIG-B #4 850 may carry the same information on 20 MHz subchannels 840-*d*, 840-*h*, 840-*l*, and 840-*p*. HE-SIG-B #1 may include user blocks for a first set of STAs 115, HE-SIG-B #2 may include user blocks of a second set of STAs 115, HE-SIG-B #3 for a third set, and HE-SIG-B #4 for a fourth set. The user blocks may include resource allocation information to assist the STAs 115 in identifying resources in a data field. Transmitting HE-SIG-B duplicates may increase the likelihood that the HE-SIG-B information is received.

In some implementations, an AP 105 may indicate that two 20 MHz subchannels in an 80 MHz bandwidth are punctured. For example, the AP 105 may indicate that 20 MHz subchannels 840-*d* and 840-*c* are punctured (such as spoofed punctured subchannels 865) in HE-SIG-A information, but the AP 105 may transmit HE-SIG-B information to schedule S160 815 on the spoofed punctured subchannel 865. The AP 105 may transmit the HE-SIG-A information on each 20 MHz subchannel 840 of P80 820. A 160 MHz device may refrain from decoding HE-SIG-B information in the spoofed punctured subchannels 865.

A 320 MHz device may still decode the spoofed punctured subchannels 865, despite the indication that the subchannels are punctured. The 320 MHz device may decode HE-SIG-B #3 855 and HE-SIG-B #4 860 in 20 MHz subchannels 840-*c* and 840-*d* respectively. The 320 MHz device may obtain scheduling information for P160 in 20 MHz subchannels 840-*a* and 840-*b* and scheduling information for S160 in the spoofed punctured subchannels 865. Resource scheduling for P160 810 and S160 815 may be handled independently. Therefore, properties of OFDMA transmissions in each of the 160 MHz bandwidths may be configured independently. If the 320 MHz STA 115 is unable to decode 20 MHz subchannel 840-*c* and 840-*d*, the subchannels may actually be punctured, not spoofed, and the 320 MHz STA 115 may determine there are no resources allocated for the 320 MHz STA 115 in S160 815.

In some implementations, the spoofed puncturing scheme may lead to lower power usage for the 320 MHZ STAs 115, as the 320 MHZ devices may monitor a smaller bandwidth to receive 320 MHz scheduling information. The 320 MHz device may monitor 20 MHz subchannels 820 just in P80 820 to receive scheduling information for the 320 MHz channel 805 instead of monitoring both P80 820 for P160 810 and 20 MHz subchannels 840 in S160 815. However, if the channel is actually punctured, the 320 MHz STA 115 may waste power by decoding the punctured channels.

A 160 MHz STA 115 also may receive the HE-SIG-A information and refrain from decoding the spoofed punctured subchannels 865. The 160 MHz STA 115 may still decode 20 MHz subchannel 840-*a* or 840-*b*, or both to receive scheduling information for P160 810. Thus, the AP 105 may multiplex 320 MHz STAs 115 and 160 MHz STAs 115 without adversely affecting scheduling for the 160 MHz STAs 115.

Figure 9:
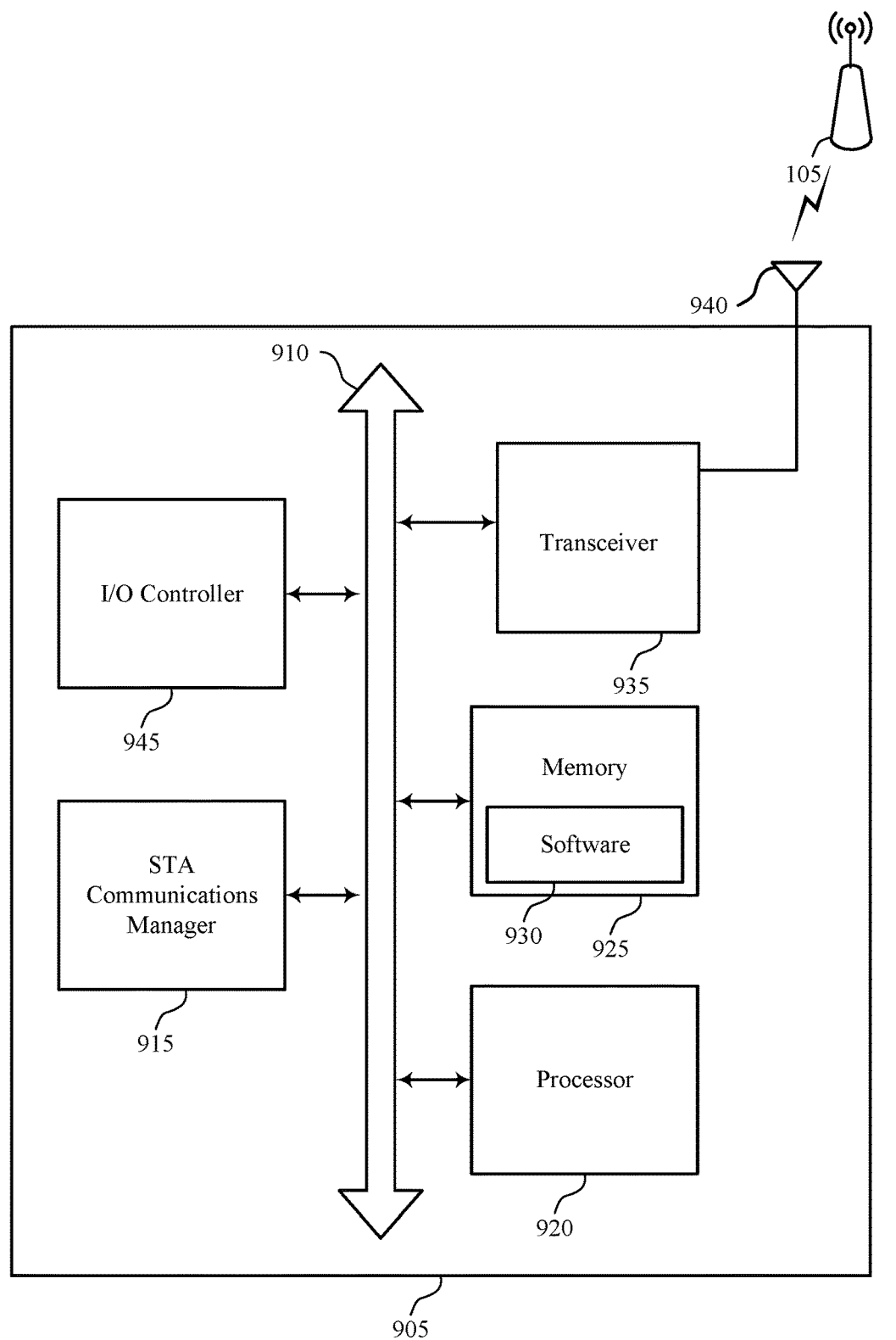
FIG. 9 shows a block diagram of an example system including a wireless device that supports multiplexing clients in wireless local area network transmissions.

FIG. 9 shows a block diagram of a system 900 including a device 905 that supports multiplexing clients in wireless local area network transmissions. The device 905 may be an example of or include the components of a STA 115 as described with reference to FIG. 1. The device 905 may include components for bi-directional voice and data communications including components for transmitting and receiving communications, including a STA communications manager 915, processor 920, memory 925, software 930, transceiver 935, antenna 940, and an I/O controller 945. These components may be in electronic communication via one or more buses (such as bus 910).

The processor 920 may include an intelligent hardware device, (such as a general-purpose processor, a DSP, a central processing unit (CPU), a microcontroller, an ASIC, an FPGA, a programmable logic device, a discrete gate or transistor logic component, a discrete hardware component, or any combination thereof). In some implementations, processor 920 may be configured to operate a memory array using a memory controller. In some other implementations, a memory controller may be integrated into the processor 920. The processor 920 may be configured to execute computer-readable instructions stored in a memory to perform various functions (such as functions or tasks supporting multiplexing clients in wireless local area network transmissions).

The memory 925 may include random access memory (RAM) and read only memory (ROM). The memory 925 may store computer-readable, computer-executable software 930 including instructions that, when executed, cause the processor 920 to perform various functions described herein. In some implementations, the memory 925 may contain, among other things, a basic input/output system (BIOS) which may control basic hardware or software operation such as the interaction with peripheral components or devices.

The software 930 may include code to implement aspects of the present disclosure, including code to support multiplexing clients in wireless local area network transmissions. The software 930 may be stored in a non-transitory computer-readable medium such as system memory or other memory. In some implementations, the software 930 may not be directly executable by the processor 920 but may cause a computer (such as when compiled and executed) to perform functions described herein.

The transceiver 935 may communicate bi-directionally, via one or more antennas, wired, or wireless links as described herein. For example, the transceiver 935 may represent a wireless transceiver and may communicate bi-directionally with another wireless transceiver. The transceiver 935 also may include a modem to modulate the packets and provide the modulated packets to the antennas for transmission, and to demodulate packets received from the antennas. The transceiver 935 may receive information such as packets, user data, or control information associated with various information channels (such as control channels, data channels, and information related to multiplexing clients in wireless local area network transmissions, etc.). Information may be passed on to other components of the device. The transceiver 935 may transmit signals generated by other components of the device. In some examples, a transmitter may be collocated with a receiver in a module of the transceiver 935.

In some implementations, the wireless device 905 may include a single antenna 940. However, in some implementations the device may have more than one antenna 940, which may be capable of concurrently transmitting or receiving multiple wireless transmissions.

The I/O controller 945 may manage input and output signals for device 905. The I/O controller 945 also may manage peripherals not integrated into device 905. In some implementations, the I/O controller 945 may represent a physical connection or port to an external peripheral. In some implementations, the I/O controller 945 may utilize an operating system such as iOS®, ANDROID®, MS-DOS®, MS-WINDOWS®, OS/2®, UNIX®, LINUX®, or another known operating system. In some implementations, the I/O controller 945 may represent or interact with a modem, a keyboard, a mouse, a touchscreen, or a similar device. In some implementations, the I/O controller 945 may be implemented as part of a processor. In some implementations, a user may interact with device 905 via the I/O controller 945 or via hardware components controlled by the I/O controller 945.

The wireless device 905 may be an example of aspects of a station (STA) 115 as described herein. The wireless device 905 may include a receiver, STA communications manager 915, and a transmitter. The wireless device 905 also may include one or more processors 920, memory 925 coupled with one or more processors 920, and instructions stored in the memory 925 that are executable by the one or more processors 920 to enable the one or more processors 920 to perform the roaming features discussed herein. Each of these components may be in communication with one another (such as via one or more buses).

One or more of STA communications manager 915 and at least some of its various sub-components may be implemented in hardware, software 930 executed by a processor 920, firmware, or any combination thereof. If implemented in software 930 executed by a processor, at least one of the functions of the STA communications manager 915 and at least some of its various sub-components may be executed by a general-purpose processor, a digital signal processor (DSP), an application-specific integrated circuit (ASIC), an field-programmable gate array (FPGA) or other programmable logic device, discrete gate or transistor logic, discrete hardware components, or any combination thereof designed to perform the functions described in the present disclosure. One or more of the STA communications manager 915 and at least some of its various sub-components may be physically located at various positions, including being distributed such that portions of functions are implemented at different physical locations by one or more physical devices. In some examples, one or more STA communications manager 915 and at least some of its various sub-components may be a separate and distinct component. In some other examples, one or more of the STA communications manager 915 and at least some of its various sub-components may be combined with one or more other hardware components, including but not limited to an I/O component, a transceiver, a network server, another computing device, one or more other components described in the present disclosure, or a combination thereof.

The STA communications manager 915 may receive, from an access point, a preamble that includes a first WLAN signaling field. The first WLAN signaling field may include a first indication of a first channel bandwidth and a second indication of a second channel bandwidth. The first channel bandwidth may include a first set of subchannels and may be used by the access point to communicate with a first set of stations. The second channel bandwidth may include the first set of subchannels and a second set of subchannels. The second channel bandwidth may be used by the access point to communicate with a second set of stations and identify a location of at least one second WLAN signaling field for the station based on the first indication of the first channel bandwidth and the second indication of the second channel bandwidth. The STA communications manager 915 also may identify a first channel bandwidth that includes a first subset of a first set of subchannels and a second subset of the first set of subchannels, the first channel bandwidth used by an access point to communicate with a first set of stations, identify a second channel bandwidth that includes the first set of subchannels and a second set of subchannels, the second channel bandwidth used by the access point to communicate with a second set of stations, including the station, receive, from the access point, a preamble that includes a first WLAN signaling field, the first WLAN signaling field including an indication of the first channel bandwidth, the indication identifying that the first subset of the first set of subchannels is punctured, and determine, based on the indication, a location of at least one second WLAN signaling field for the station in the first subset of the first set of subchannels identified as punctured.

The STA communications manager 915 also may receive, from an access point, a trigger frame that includes a WLAN common information field. The WLAN common information field may include a first indication of a first channel bandwidth and a second indication of a second channel bandwidth. The first channel bandwidth may include a first set of subchannels and may be used by the access point to communicate with a first set of stations. The second channel bandwidth may include the first set of subchannels and a second set of subchannels. The second channel bandwidth may be used by the access point to communicate with a second set of stations. The STA communications manager 915 also may identify, based on the first indication of the first channel bandwidth and the second indication of the second channel bandwidth, a resource unit of the first channel bandwidth or the second channel bandwidth for the station. The STA communications manager 915 also may transmit a trigger-based frame to the access point based on the identified resource unit.

Additionally, or alternatively, the device 905 may include an interface and a processing system. The processing system may be in electronic communication with the interface. The processing system and interface may include aspects of the STA communications manager 915, memory 925, software 930, and processor 920. The processing system and interface also may be in electronic communication with the I/O controller 945 and transceiver 935 (e.g., via the bus 910).

The STA communications manager 915 may include a preamble component, signaling field identifying component, channel identifier, subchannel identifier, trigger frame receiver, resource unit identifier, trigger-based frame transmitter, signaling field decoding component, and a resource allocation determining component. Each of these modules may communicate, directly or indirectly, with one another (such as via one or more buses).

The preamble component may receive, from an access point, a preamble that includes a first WLAN signaling field, the first WLAN signaling field including a first indication of a first channel bandwidth and a second indication of a second channel bandwidth. The first channel bandwidth may include a first set of subchannels and may be used by the access point to communicate with a first set of stations. The second channel bandwidth may include the first set of subchannels and a second set of subchannels, and the second channel bandwidth may be used by the access point to communicate with a second set of stations. The preamble component also may decode a first of the at least one second WLAN signaling field for the station in the first subset of the first set of subchannels identified as punctured, and receive, from the access point, a preamble that includes a first WLAN signaling field. The first WLAN signaling field may include an indication of the first channel bandwidth, the indication identifying that the first subset of the first set of subchannels is punctured. In some implementations, the at least one second WLAN signaling field includes at least one HE-SIG-B field. In some implementations, the second indication of the second channel bandwidth includes a combination of a value of a DCM field of the first WLAN signaling field and a value of an MCS field of the first WLAN signaling field, the DCM field and the MCS field applicable to the second WLAN signaling field. In some implementations, the DCM field includes a SIGB DCM field. In some implementations, the MCS field includes a SIGB MCS field. In some implementations, the first indication of the first channel bandwidth includes a value of a bandwidth field of the first WLAN signaling field. In some implementations, the indication of the first channel bandwidth identifies that the first subset of the first set of subchannels is punctured, and includes a value of a bandwidth field of the first WLAN signaling field. In some implementations, the indication of the first channel bandwidth, identifies that the first subset of the first set of subchannels is punctured, and includes an indication of preamble puncturing for the first channel bandwidth, the first channel bandwidth including 160 MHz. In some implementations, the first WLAN signaling field include an HE-SIG-A field.

The signaling field identifying component may identify a location of at least one second WLAN signaling field for the station based on the first indication of the first channel bandwidth and the second indication of the second channel bandwidth. The signaling field identifying component also may identify, based on the determination, that the location of the at least one second WLAN signaling field for the station is in the second channel bandwidth. The signaling field identifying component also may identify, based on the determination, that the location of the at least one second WLAN signaling field for the station is in the first channel bandwidth. The signaling field identifying component also may determine, based on the indication, a location of at least one second WLAN signaling field for the station in the first subset of the first set of subchannels identified as punctured. In some implementations, identifying the location of the at least one second WLAN signaling field for the station includes determining that the second indication of the second channel bandwidth indicates a channel bandwidth of the station. In some implementations, identifying the location of the at least one second WLAN signaling field for the station includes determining that the first indication of the first channel bandwidth indicates a channel bandwidth of the station. In some implementations, the at least one second WLAN signaling field includes two alternating WLAN signaling field content channels spanning the first channel bandwidth or the second channel bandwidth. In some implementations, the first WLAN signaling field include an HE-SIG-A field. In some implementations, the second WLAN signaling field includes an HE-SIG-B field.

The channel identifier may identify a first channel bandwidth that includes a first subset of a first set of subchannels and a second subset of the first set of subchannels, the first channel bandwidth used by an access point to communicate with a first set of stations.

The subchannel identifier may identify a second channel bandwidth that includes the first set of subchannels and a second set of subchannels, the second channel bandwidth used by the access point to communicate with a second set of stations, including the station. In some implementations, the second subset of the first set of subchannels includes a first subchannel and a second subchannel of the first set of subchannels. In some implementations, the first subset of the first set of subchannels includes a third subchannel and a fourth subchannel of the first set of subchannels.

The trigger frame receiver may receive, from an access point, a trigger frame that includes a WLAN common information field, the WLAN common information field including a first indication of a first channel bandwidth and a second indication of a second channel bandwidth. The first channel bandwidth may include a first set of subchannels and be used by the access point to communicate with a first set of stations. The second channel bandwidth may include the first set of subchannels and a second set of subchannels, and the second channel bandwidth may be used by the access point to communicate with a second set of stations. In some implementations, the second subfield of the WLAN common information field includes an HE-SIG-A field reserved subfield. In some implementations, the first indication of the first channel bandwidth includes a value of a bandwidth subfield of the trigger frame. In some implementations, the second indication of the second channel bandwidth includes a value of a second subfield of the WLAN common information field. In some implementations, the first channel bandwidth includes 160 MHz. In some implementations, the second channel bandwidth includes 320 MHz.

The resource unit identifier may identify, based on the first indication of the first channel bandwidth and the second indication of the second channel bandwidth, a resource unit of the first channel bandwidth or the second channel bandwidth for the station. The resource unit identifier also may determine that the resource unit for the station is in the second channel bandwidth based on identifying a second value of the second indication of the second channel bandwidth. The resource unit identifier also may identify, based on the decoded resource unit allocation subfield, the resource unit of the first channel bandwidth or the second channel bandwidth for the station to use to transmit in the trigger-based frame. In some implementations, identifying the resource unit of the first channel bandwidth or the second channel bandwidth for the station includes determining that the resource unit for the station is in the first channel bandwidth based on identifying a first value of the second indication of the second channel bandwidth. In some implementations, identifying the resource unit of the first channel bandwidth or the second channel bandwidth for the station includes decoding a resource unit allocation subfield of the trigger frame. In some implementations, the resource unit is in the first channel bandwidth and is exclusive of the second channel bandwidth. In some implementations, the resource unit is in the second channel bandwidth and is exclusive of the first channel bandwidth.

The trigger-based frame transmitter may transmit a trigger-based frame to the access point based on the identified resource unit.

The signaling field decoding component may decode the first WLAN signaling field in at least one subchannel of the set of subchannels of the first channel bandwidth. The signaling field decoding component also may decode the at least one second WLAN signaling field for the station. The identified location of the at least one second WLAN signaling field may be in the second channel bandwidth. The signaling field decoding component also may decode the at least one second WLAN signaling field for the station. The identified location of the at least one second WLAN signaling field may be in the first channel bandwidth. The signaling field decoding component also may decode a second of the at least one second WLAN signaling field for the station in the second subset of the first set of sub channels.

The resource allocation determining component may determine a resource allocation for data transmissions to the station in the second channel bandwidth based on the decoded at least one second WLAN signaling field. The resource allocation determining component also may determine a first resource allocation for data transmissions to the station in the second channel bandwidth based on the decoded at least one second WLAN signaling field. The resource allocation determining component also may determine a second resource allocation for data transmissions to the station in the first channel bandwidth based on the decoded second of the at least one second WLAN signaling field. In some implementations, the determined resource allocation for data transmissions to the station in the second channel bandwidth is exclusive of the first channel bandwidth. In some implementations, the determined first resource allocation for data transmissions to the station in the second channel bandwidth is exclusive of the first channel bandwidth.

Figure 10:
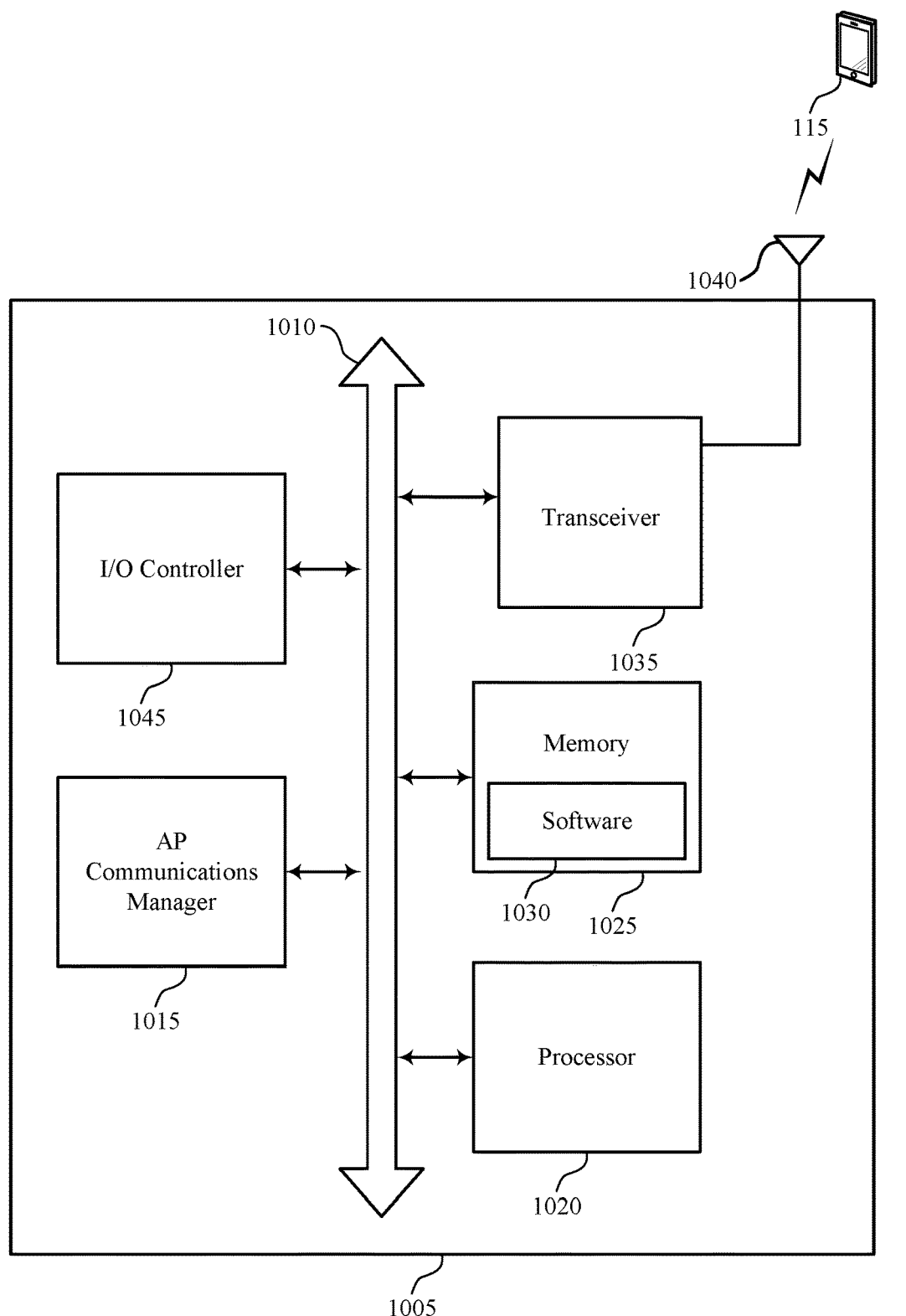
FIG. 10 shows a block diagram of an example system including a device that supports multiplexing clients in wireless local area network transmissions.

FIG. 10 shows a block diagram of a system 1000 including a device 1005 that supports multiplexing clients in wireless local area network transmissions. Device 1005 may be an example of or include the components of AP 105 as described herein, such as with reference to FIG. 1. The device 1005 may include components for bi-directional voice and data communications including components for transmitting and receiving communications, including an AP communications manager 1015, processor 1020, memory 1025, software 1030, transceiver 1035, antenna 1040, and an I/O controller 1045. These components may be in electronic communication via one or more buses (such as bus 1010).

The processor 1020 may include an intelligent hardware device, (such as a general-purpose processor, a DSP, a CPU, a microcontroller, an ASIC, an FPGA, a programmable logic device, a discrete gate or transistor logic component, a discrete hardware component, or any combination thereof). In some implementations, the processor 1020 may be configured to operate a memory array using a memory controller. In other cases, a memory controller may be integrated into the processor 1020. The processor 1020 may be configured to execute computer-readable instructions stored in a memory to perform various functions (such as functions or tasks supporting multiplexing clients in wireless local area network transmissions).

The memory 1025 may include RAM and ROM. The memory 1025 may store computer-readable, computer-executable software 1030 including instructions that, when executed, cause the processor 1020 to perform various functions described herein. In some implementations, the memory 1025 may contain, among other things, a BIOS which may control basic hardware or software operation such as the interaction with peripheral components or devices.

The software 1030 may include code to implement aspects of the present disclosure, including code to support multiplexing clients in wireless local area network transmissions. The software 1030 may be stored in a non-transitory computer-readable medium such as system memory or other memory. In some implementations, the software 1030 may not be directly executable by the processor 1020 but may cause a computer (such as when compiled and executed) to perform functions described herein.

The transceiver 1035 may communicate bi-directionally, via one or more antennas, wired, or wireless links as described herein. For example, the transceiver 1035 may represent a wireless transceiver and may communicate bi-directionally with another wireless transceiver. The transceiver 1035 also may include a modem to modulate the packets and provide the modulated packets to the antennas for transmission, and to demodulate packets received from the antennas. The transceiver 1035 may receive information such as packets, user data, or control information associated with various information channels (such as control channels, data channels, and information related to multiplexing clients in wireless local area network transmissions, etc.). Information may be passed on to other components of the device. The transceiver 1035 may transmit signals generated by other components of the device.

In some implementations, the wireless device 1005 may include a single antenna 1040. However, in some implementations the device may have more than one antenna 1040, which may be capable of concurrently transmitting or receiving multiple wireless transmissions.

The I/O controller 1045 may manage input and output signals for the device 1005. The I/O controller 1045 also may manage peripherals not integrated into the device 1005. In some implementations, the I/O controller 1045 may represent a physical connection or port to an external peripheral. In some implementations, the I/O controller 1045 may utilize an operating system such as iOS®, ANDROID®, MS-DOS®, MS-WINDOWS®, OS/2®, UNIX®, LINUX®, or another known operating system. In some other cases, the I/O controller 1045 may represent or interact with a modem, a keyboard, a mouse, a touchscreen, or a similar device. In some implementations, the I/O controller 1045 may be implemented as part of a processor 1020. In some implementations, a user may interact with the device 1005 via the I/O controller 1045 or via hardware components controlled by the I/O controller 1045.

One or more of AP communications manager 1015 and at least some of its various sub-components may be implemented in hardware, software 1030 executed by a processor 1020, firmware, or any combination thereof. If implemented in software 1030 executed by a processor 1020, at least one of the functions of the AP communications manager 1015 and at least some of its various sub-components may be executed by a general-purpose processor, a DSP, an ASIC, an FPGA or other programmable logic device, discrete gate or transistor logic, discrete hardware components, or any combination thereof designed to perform the functions described in the present disclosure. One or more of the AP communications manager 1015 and at least some of its various sub-components may be physically located at various positions, including being distributed such that portions of functions are implemented at different physical locations by one or more physical devices. In some examples, one or more of AP communications manager 1015 and at least some of its various sub-components may be a separate and distinct component. In some other examples, one or more of AP communications manager 1015 and at least some of its various sub-components may be combined with one or more other hardware components, including but not limited to an I/O component, a transceiver, a network server, another computing device, one or more other components described in the present disclosure, or a combination thereof.

The AP communications manager 1015 may identify a first indication of a first channel bandwidth, the first channel bandwidth including a first set of subchannels, and the first channel bandwidth used by the access point to communicate with a first set of stations. The AP communications manager 1015 also may identify a second indication of a second channel bandwidth, the second channel bandwidth including the first set of subchannels and a second set of subchannels. The second channel bandwidth may be used by the access point to communicate with a second set of stations. The AP communications manager 1015 also may generate a first WLAN signaling field that includes the first indication of the first channel bandwidth and the second indication of the second channel bandwidth, the first WLAN signaling field identifying a location of a set of second WLAN signaling fields in the first set of subchannels and the second set of subchannels. The AP communications manager also may transmit a preamble that includes the first WLAN signaling field and the set of second WLAN signaling fields. The AP communications manager 1015 also may identify a first channel bandwidth that includes a first subset of a first set of subchannels and a second subset of the first set of subchannels. The first channel bandwidth may be used by the access point to communicate with a first set of stations. The AP communications manager 1015 also may identify a second channel bandwidth that includes the first set of subchannels and a second set of subchannels. The second channel bandwidth may be used by the access point to communicate with a second set of stations. The AP communications manager 1015 also may generate a first WLAN signaling field that includes an indication of the first channel bandwidth. The indication may identify the first subset of the first set of subchannels as punctured. The AP communications manager 1015 also may transmit a preamble that includes the first WLAN signaling field, a second WLAN signaling field for the first channel bandwidth on the first subset of the first set of subchannels, and a second WLAN signaling field for the second channel bandwidth on the second subset of the first set of subchannels. The AP communications manager 1015 also may identify a first channel bandwidth for a first set of stations to use to communicate with the access point, the first channel bandwidth including a first set of subchannels. The AP communications manager 1015 also may identify a second channel bandwidth for a second set of stations to use to communicate with the access point, the second channel bandwidth including the first set of subchannels and a second set of subchannels. The AP communications manager 1015 also may generate a WLAN common information field that includes a first indication of the first channel bandwidth and a second indication of the second channel bandwidth, and transmit a trigger frame that includes the WLAN common information field.

Additionally, or alternatively, the device 1005 may include an interface and a processing system. The processing system may be in electronic communication with the interface. The processing system and interface may include aspects of the AP communications manager 1015, memory 1025, software 1030, and processor 1020. The processing system and interface also may be in electronic communication with the I/O controller 1045 and transceiver 1035 (e.g., via the bus 1010).

The AP communications manager 1015 also may include first channel bandwidth identifier, second channel bandwidth identifier, signaling field generator, preamble transmitter, channel identifier, subchannel identifier, channel bandwidth identifier, common field generator, and trigger frame transmitter.

The first channel bandwidth identifier may identify a first indication of a first channel bandwidth, the first channel bandwidth including a first set of subchannels, and the first channel bandwidth used by the access point to communicate with a first set of stations. In some implementations, the first indication of the first channel bandwidth includes a value of a bandwidth field of the first WLAN signaling field. In some implementations, the first channel bandwidth is used by the access point to communicate with the first set of stations according to a first radio access technology (RAT), and the second set of stations according to a second RAT. In some implementations, the first channel bandwidth includes 160 MHz.

The second channel bandwidth identifier may identify a second indication of a second channel bandwidth, the second channel bandwidth including the first set of subchannels and a second set of subchannels, and the second channel bandwidth used by the access point to communicate with a second set of stations. In some implementations, the second indication of the second channel bandwidth includes a combination of a value of a DCM field of the first WLAN signaling field and a value of an MCS field of the first WLAN signaling field, the DCM field and the MCS field applicable to the second WLAN signaling field. In some implementations, the DCM field includes a SIGB DCM field. In some implementations, the MCS field includes a SIGB MCS field. In some implementations, the second channel bandwidth is used by the access point to communicate with the second set of stations according to the second RAT. In some implementations, the second channel bandwidth includes 320 MHz.

The signaling field generator may generate a first WLAN signaling field that includes the first indication of the first channel bandwidth and the second indication of the second channel bandwidth, the first WLAN signaling field identifying a location of a set of second WLAN signaling fields in the first set of subchannels and the second set of subchannels. The signaling field generator also may generate a second set of the set of second WLAN signaling fields for the second set of stations in the second set of subchannels, and generate a first set of the set of second WLAN signaling fields for the first set of stations in the first set of subchannels. The signaling field generator also may generate a first WLAN signaling field that includes an indication of the first channel bandwidth, the indication identifying the first subset of the first set of subchannels as punctured. In some implementations, the indication of the first channel bandwidth, the indication identifying that the first subset of the first set of subchannels is punctured, includes an indication of preamble puncturing for the first channel bandwidth, the first channel bandwidth including 160 MHz. In some implementations, the first set of the set of second WLAN signaling fields includes two alternating WLAN signaling field content channels spanning the first channel bandwidth. In some implementations, the second set of the set of second WLAN signaling fields includes two alternating WLAN signaling field content channels spanning the second channel bandwidth. In some implementations, the second WLAN signaling field includes a HE-SIG-B field. In some implementations, the first WLAN signaling field includes an HE-SIG-A field, or an L-SIG, or an RL-SIG field, or a combination thereof, where the second channel bandwidth is indicated at least in part by the L-SIG field, or the RL-SIG field, or a combination thereof. In some implementations, the indication of the first channel bandwidth, the indication identifying that the first subset of the first set of subchannels is punctured, includes a value of a bandwidth field of the first WLAN signaling field. In some implementations, the first WLAN signaling field include an HE-SIG-A field.

The preamble transmitter may transmit a preamble that includes the first WLAN signaling field and the set of second WLAN signaling fields and transmit a preamble that includes the first WLAN signaling field, a second WLAN signaling field for the first channel bandwidth on the first subset of the first set of subchannels, and a second WLAN signaling field for the second channel bandwidth on the second subset of the first set of subchannels.

The channel identifier may identify a first channel bandwidth that includes a first subset of a first set of subchannels and a second subset of the first set of subchannels, the first channel bandwidth used by the access point to communicate with a first set of stations.

The subchannel identifier may identify a second channel bandwidth that includes the first set of subchannels and a second set of subchannels, the second channel bandwidth used by the access point to communicate with a second set of stations. In some implementations, the second subset of the first set of subchannels includes a first subchannel and a second subchannel of the first set of subchannels. In some implementations, the first subset of the first set of subchannels includes a third subchannel and a fourth subchannel of the first set of subchannels.

The channel bandwidth identifier may identify a first channel bandwidth for a first set of stations to use to communicate with the access point, the first channel bandwidth including a first set of subchannels and identify a second channel bandwidth for a second set of stations to use to communicate with the access point, the second channel bandwidth including the first set of subchannels and a second set of subchannels. In some implementations, the resource units in the first channel bandwidth are exclusive of the second channel bandwidth. In some implementations, the resource units in the second channel bandwidth are exclusive of the first channel bandwidth.

The common field generator may generate a WLAN common information field the includes a first indication of the first channel bandwidth and a second indication of the second channel bandwidth. In some implementations, the first indication of the first channel bandwidth includes a value of a bandwidth subfield of the WLAN common information field. In some implementations, the second indication of the second channel bandwidth includes a value of a second subfield of the WLAN common information field. In some implementations, the second subfield of the WLAN common information field includes an HE-SIG-A reserved subfield.

The trigger frame transmitter may transmit a trigger frame that includes the WLAN common information field, identify a resource unit for a station in the second set of subchannels, and transmit a resource unit allocation subfield in the trigger frame that indicates the identified resource unit in the WLAN common information field.

The resource allocation component may allocate resource units for data transmissions to the first set of stations in the first channel bandwidth exclusive of the second channel bandwidth and allocate resource units for data transmissions to the second set of stations in the second channel bandwidth exclusive of the first channel bandwidth.

The trigger-based frame receiver may receive, in response to the transmitted trigger frame, a trigger-based frame from at least one of the first set of stations and at least one of the second set of stations, the trigger-based frame including resource units in the first channel bandwidth and resource units in the second channel bandwidth.

Figure 11:
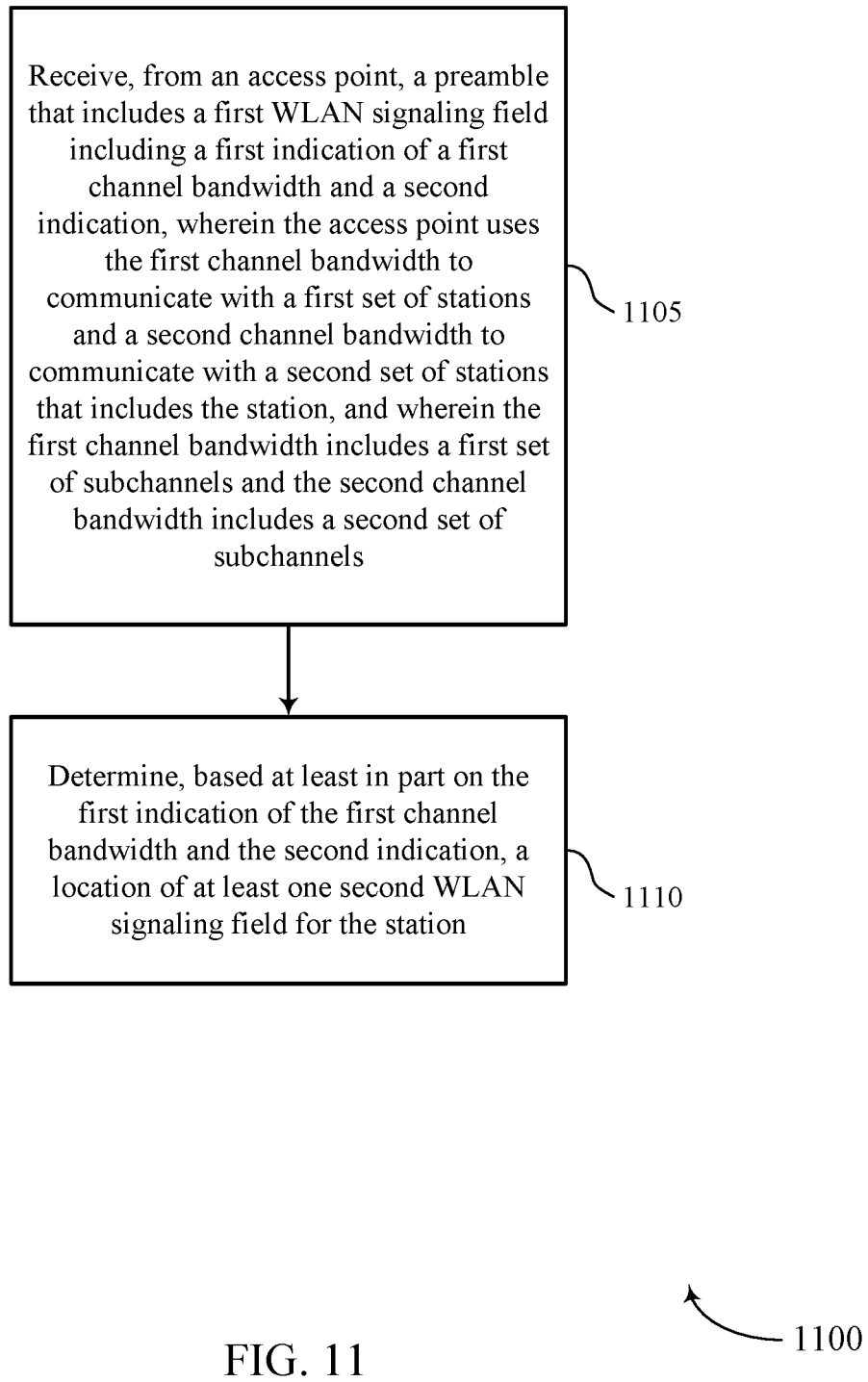
FIGS. 11-18 show flowcharts illustrating example methods for multiplexing clients in wireless local area network transmissions.

FIG. 11 shows a flowchart illustrating a method 1100 for multiplexing clients in wireless local area network transmissions. The operations of method 1100 may be implemented by a STA 115 or its components as described herein. For example, the operations of method 1100 may be performed by a STA communications manager as described with reference to FIG. 9. In some examples, a STA 115 may execute a set of codes to control the functional elements of the device to perform the functions described herein. Additionally, or alternatively, the STA 115 may perform aspects of the functions described herein using special-purpose hardware.

At 1105 the STA 115 may receive, from an access point, a preamble that includes a first WLAN signaling field including a first indication of a first channel bandwidth and a second indication. The access point may use the first channel bandwidth to communicate with a first set of stations and a second channel bandwidth to communicate with a second set of stations that includes the station. The first channel bandwidth may include a first set of subchannels and the second channel bandwidth includes a second set of subchannels. The operations of 1105 may be performed according to the methods described herein. In some implementations, aspects of the operations of 1105 may be performed by a preamble component as described with reference to FIG. 9.

At 1110 the STA 115 may determine, based at least in part on the first indication of the first channel bandwidth and the second indication, a location of at least one second WLAN signaling field for the station. The operations of 1110 may be performed according to the methods described herein. In some implementations, aspects of the operations of 1110 may be performed by a signaling field identifying component as described with reference to FIG. 9.

Figure 12:
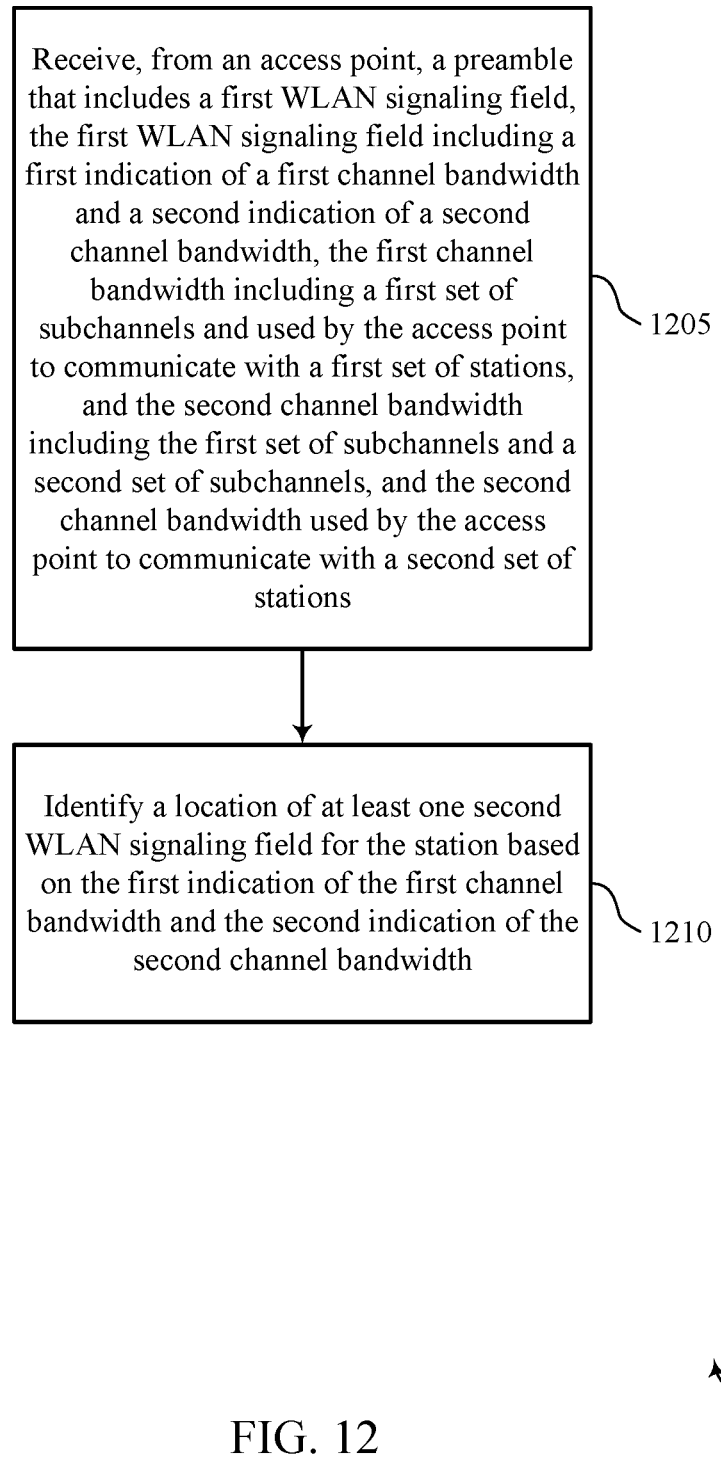

FIG. 12 shows a flowchart illustrating a method 1200 for multiplexing clients in wireless local area network transmissions. The operations of method 1200 may be implemented by a STA 115 or its components as described herein. For example, the operations of method 1200 may be performed by a STA communications manager as described with reference to FIG. 9. In some examples, a STA 115 may execute a set of codes to control the functional elements of the device to perform the functions described herein. Additionally, or alternatively, the STA 115 may perform aspects of the functions described herein using special-purpose hardware.

At 1205 the STA 115 may receive, from an access point, a preamble that includes a first WLAN signaling field, the first WLAN signaling field including a first indication of a first channel bandwidth and a second indication of a second channel bandwidth. The first channel bandwidth may include a first set of subchannels and may be used by the access point to communicate with a first set of stations. The second channel bandwidth may include the first set of subchannels and a second set of subchannels, and the second channel bandwidth may be used by the access point to communicate with a second set of stations. The operations of 1205 may be performed according to the methods described herein. In some implementations, aspects of the operations of 1205 may be performed by a preamble component as described with reference to FIG. 9.

At 1210 the STA 115 may identify a location of at least one second WLAN signaling field for the station based at least in part on the first indication of the first channel bandwidth and the second indication of the second channel bandwidth. The operations of 1210 may be performed according to the methods described herein. In some implementations, aspects of the operations of 1210 may be performed by a signaling field identifying component as described with reference to FIG. 9.

Figure 13:
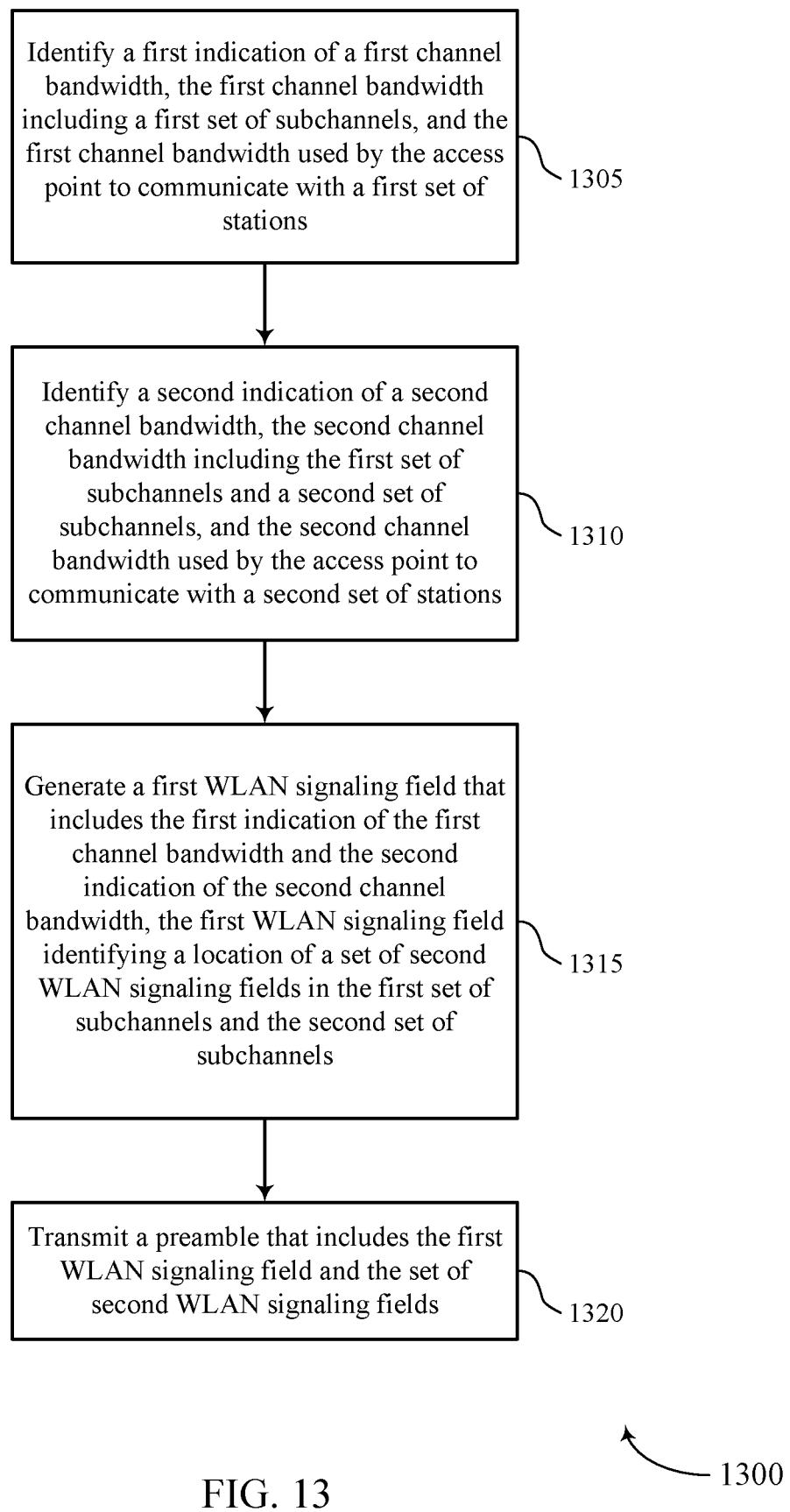

FIG. 13 shows a flowchart illustrating a method 1300 for multiplexing clients in wireless local area network transmissions. The operations of method 1300 may be implemented by an AP 105 or its components as described herein. For example, the operations of method 1300 may be performed by an AP communications manager as described with reference to FIG. 10. In some examples, an AP 105 may execute a set of codes to control the functional elements of the device to perform the functions described herein. Additionally, or alternatively, the AP 105 may perform aspects of the functions described herein using special-purpose hardware.

At 1305 the AP 105 may identify a first indication of a first channel bandwidth, the first channel bandwidth including a first set of subchannels, and the first channel bandwidth used by the access point to communicate with a first set of stations. The operations of 1305 may be performed according to the methods described herein. In some implementations, aspects of the operations of 1305 may be performed by a first channel bandwidth identifier as described with reference to FIG. 10.

At 1310 the AP 105 may identify a second indication of a second channel bandwidth, the second channel bandwidth including the first set of subchannels and a second set of subchannels, and the second channel bandwidth used by the access point to communicate with a second set of stations. The operations of 1310 may be performed according to the methods described herein. In some implementations, aspects of the operations of 1310 may be performed by a second channel bandwidth identifier as described with reference to FIG. 10.

At 1315 the AP 105 may generate a first WLAN signaling field that includes the first indication of the first channel bandwidth and the second indication of the second channel bandwidth, the first WLAN signaling field identifying a location of a plurality of second WLAN signaling fields in the first set of subchannels and the second set of subchannels. The operations of 1315 may be performed according to the methods described herein. In some implementations, aspects of the operations of 1315 may be performed by a signaling field generator as described with reference to FIG. 10.

At 1320 the AP 105 may transmit a preamble that includes the first WLAN signaling field and the plurality of second WLAN signaling fields. The operations of 1320 may be performed according to the methods described herein. In some implementations, aspects of the operations of 1320 may be performed by a preamble transmitter as described with reference to FIG. 10.

Figure 14:
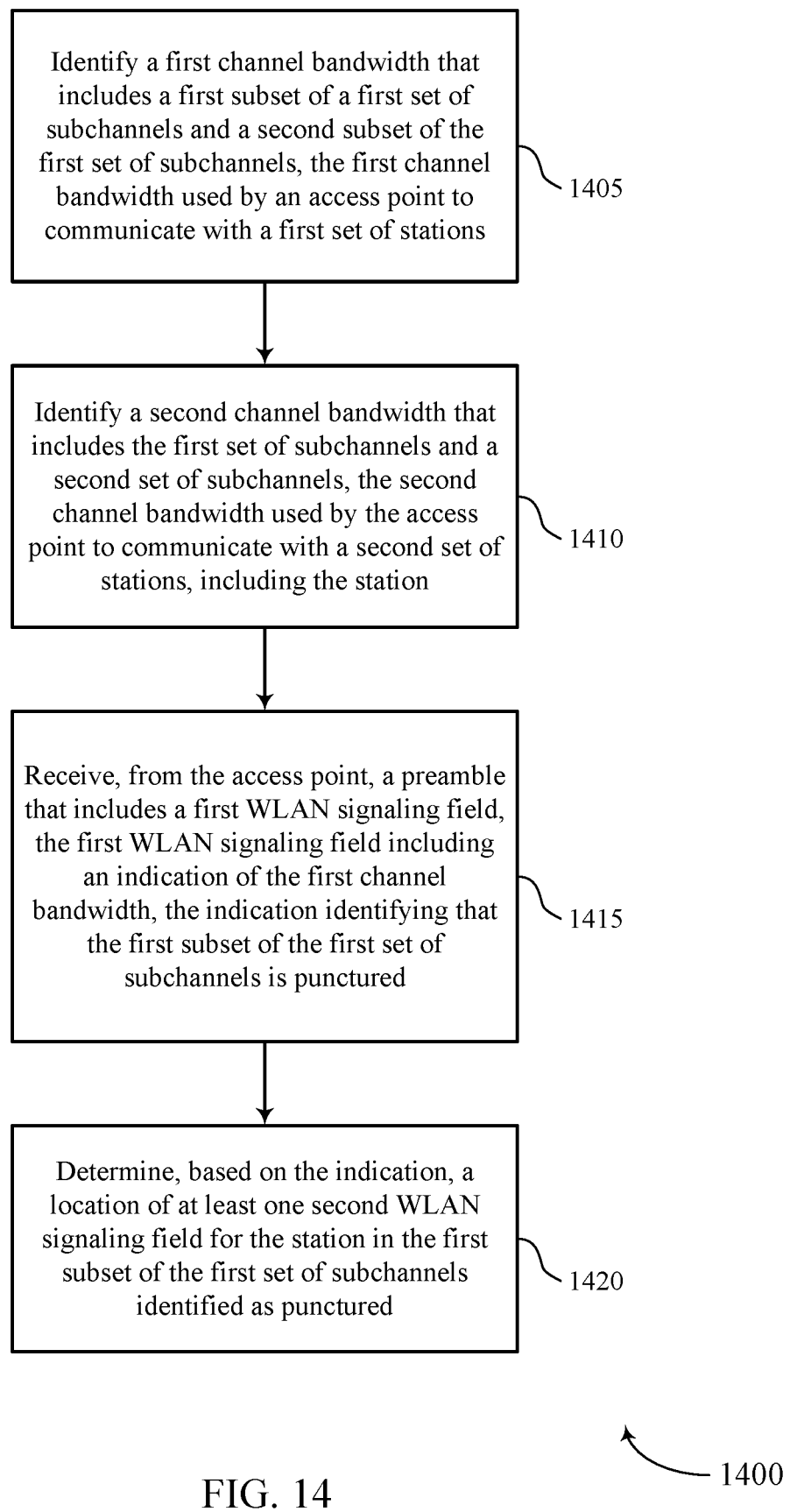

FIG. 14 shows a flowchart illustrating a method 00 for multiplexing clients in wireless local area network transmissions. The operations of method 00 may be implemented by a STA 115 or its components as described herein. For example, the operations of method 00 may be performed by a STA communications manager as described with reference to FIG. 9. In some examples, a STA 115 may execute a set of codes to control the functional elements of the device to perform the functions described herein. Additionally, or alternatively, the STA 115 may perform aspects of the functions described herein using special-purpose hardware.

At 05 the STA 115 may identify a first channel bandwidth that includes a first subset of a first set of subchannels and a second subset of the first set of subchannels, the first channel bandwidth used by an access point to communicate with a first set of stations. The operations of 05 may be performed according to the methods described herein. In some implementations, aspects of the operations of 05 may be performed by a channel identifier as described with reference to FIG. 9.

At 10 the STA 115 may identify a second channel bandwidth that includes the first set of subchannels and a second set of subchannels, the second channel bandwidth used by the access point to communicate with a second set of stations, including the station. The operations of 10 may be performed according to the methods described herein. In some implementations, aspects of the operations of 10 may be performed by a subchannel identifier as described with reference to FIG. 9.

At 15 the STA 115 may receive, from the access point, a preamble that includes a first WLAN signaling field, the first WLAN signaling field including an indication of the first channel bandwidth, the indication identifying that the first subset of the first set of subchannels is punctured. The operations of 15 may be performed according to the methods described herein. In some implementations, aspects of the operations of 15 may be performed by a preamble component as described with reference to FIG. 9.

At 20 the STA 115 may determine, based at least in part on the indication, a location of at least one second WLAN signaling field for the station in the first subset of the first set of subchannels identified as punctured. The operations of 20 may be performed according to the methods described herein. In some implementations, aspects of the operations of 20 may be performed by a signaling field identifying component as described with reference to FIG. 9.

Figure 15:
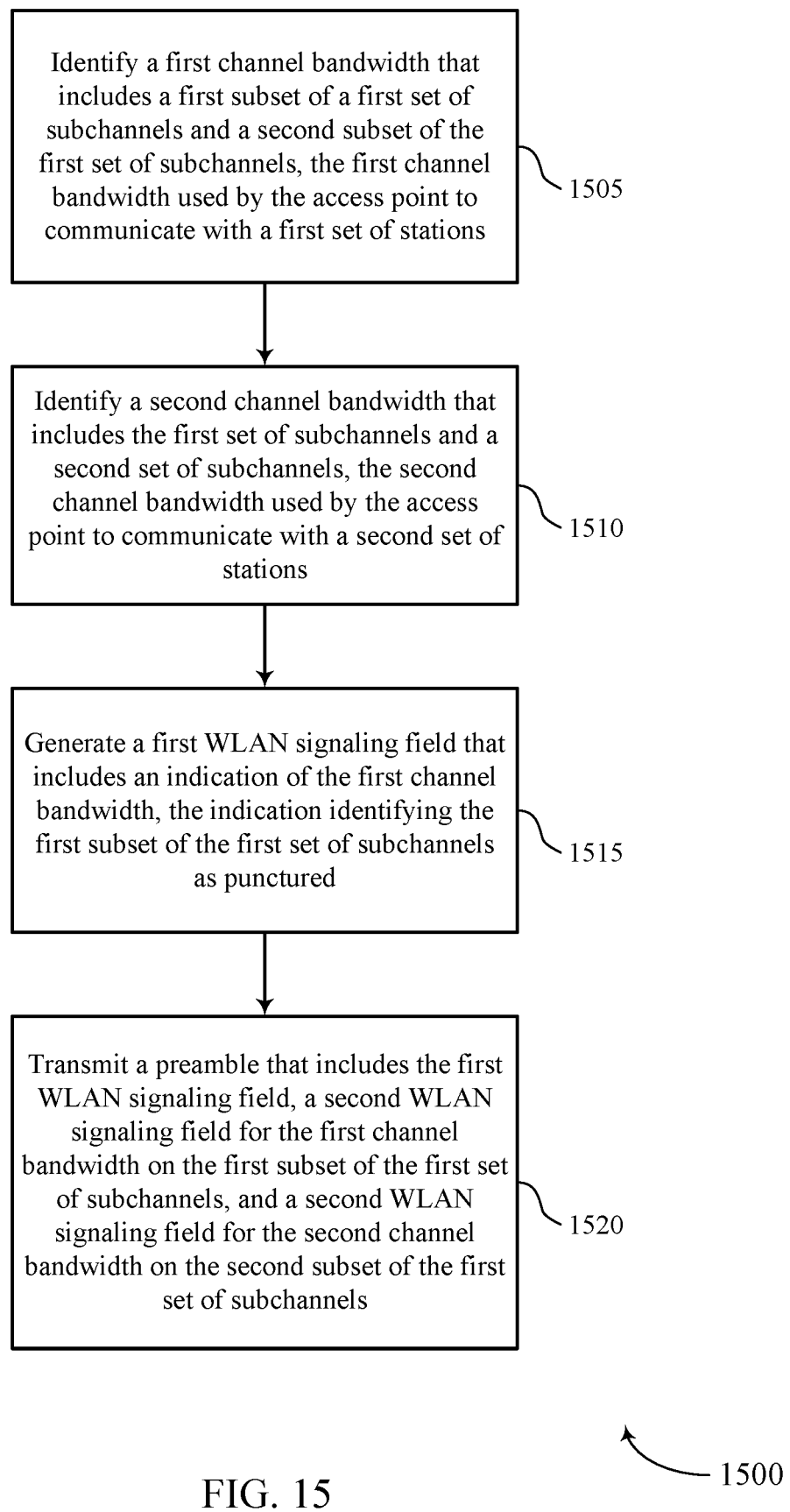

FIG. 15 shows a flowchart illustrating a method 1500 for multiplexing clients in wireless local area network transmissions. The operations of method 1500 may be implemented by an AP 105 or its components as described herein. For example, the operations of method 1500 may be performed by an AP communications manager as described with reference to FIG. 10. In some implementations, an AP 105 may execute a set of codes to control the functional elements of the device to perform the functions described herein. Additionally, or alternatively, the AP 105 may perform aspects of the functions described herein using special-purpose hardware.

At 1505 the AP 105 may identify a first channel bandwidth that includes a first subset of a first set of subchannels and a second subset of the first set of subchannels, the first channel bandwidth used by the access point to communicate with a first set of stations. The operations of 1505 may be performed according to the methods described herein. In some implementations, aspects of the operations of 1505 may be performed by a channel identifier as described with reference to FIG. 10.

At 1510 the AP 105 may identify a second channel bandwidth that includes the first set of subchannels and a second set of subchannels, the second channel bandwidth used by the access point to communicate with a second set of stations. The operations of 1510 may be performed according to the methods described herein. In some implementations, aspects of the operations of 1510 may be performed by a subchannel identifier as described with reference to FIG. 10.

At 1515 the AP 105 may generate a first WLAN signaling field that includes an indication of the first channel bandwidth, the indication identifying the first subset of the first set of subchannels as punctured. The operations of 1515 may be performed according to the methods described herein. In some implementations, aspects of the operations of 1515 may be performed by a signaling field generator as described with reference to FIG. 10.

At 1520 the AP 105 may transmit a preamble that includes the first WLAN signaling field, a second WLAN signaling field for the first channel bandwidth on the first subset of the first set of subchannels, and a second WLAN signaling field for the second channel bandwidth on the second subset of the first set of subchannels. The operations of 1520 may be performed according to the methods described herein. In some implementations, aspects of the operations of 1520 may be performed by a preamble transmitter as described with reference to FIG. 10.

Figure 16:
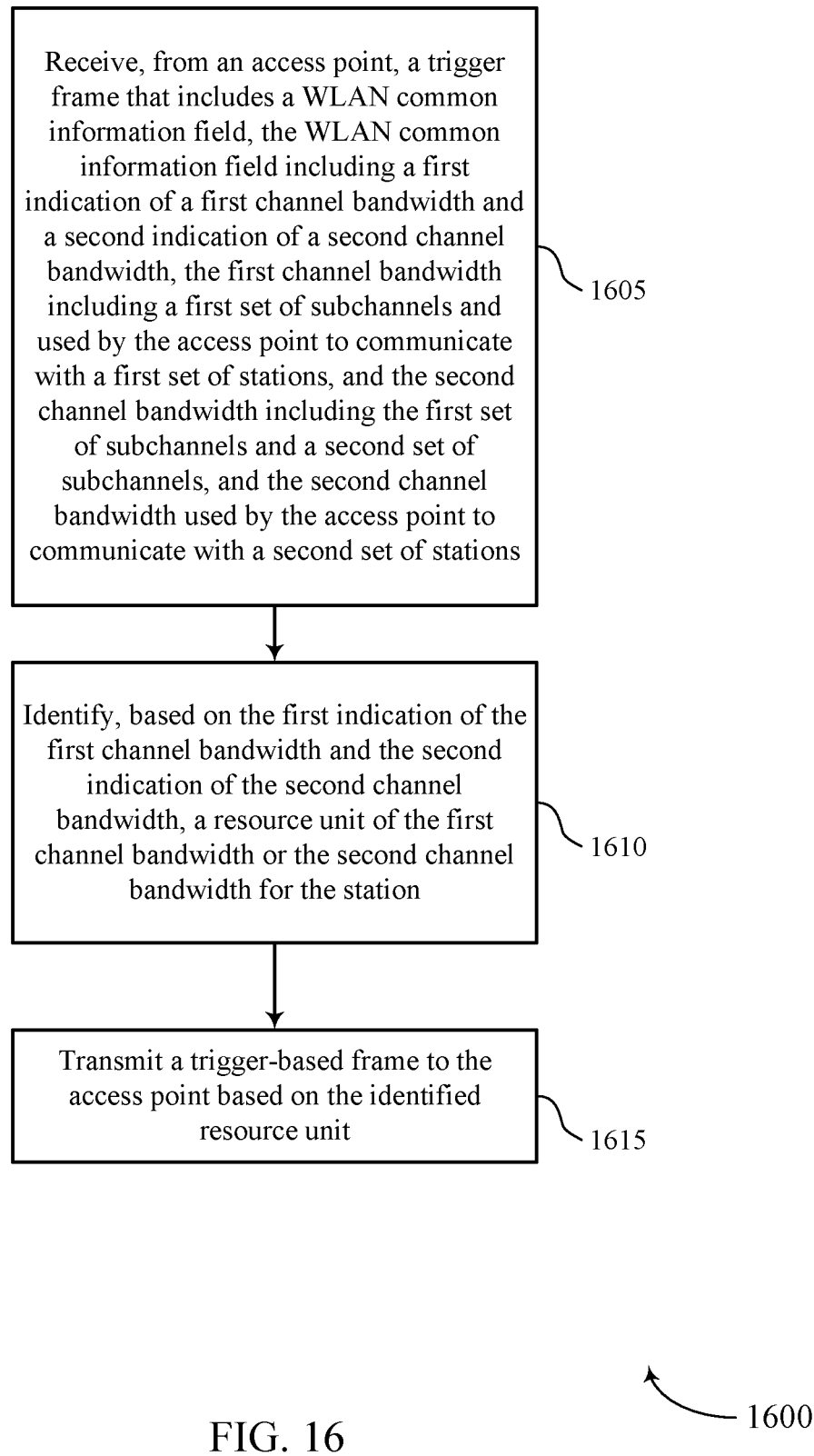

FIG. 16 shows a flowchart illustrating a method 1600 for multiplexing clients in wireless local area network transmissions. The operations of method 1600 may be implemented by a STA 115 or its components as described herein. For example, the operations of method 1600 may be performed by a STA communications manager as described with reference to FIG. 9. In some examples, a STA 115 may execute a set of codes to control the functional elements of the device to perform the functions described herein. Additionally, or alternatively, the STA 115 may perform aspects of the functions described herein using special-purpose hardware.

At 1605 the STA 115 may receive, from an access point, a trigger frame that includes a WLAN common information field, the WLAN common information field including a first indication of a first channel bandwidth and a second indication of a second channel bandwidth. The first channel bandwidth may include a first set of subchannels and may be used by the access point to communicate with a first set of stations. The second channel bandwidth may include the first set of subchannels and a second set of subchannels, and the second channel bandwidth may be used by the access point to communicate with a second set of stations. The operations of 1605 may be performed according to the methods described herein. In some implementations, aspects of the operations of 1605 may be performed by a trigger frame receiver as described with reference to FIG. 9.

At 1610 the STA 115 may identify, based at least in part on the first indication of the first channel bandwidth and the second indication of the second channel bandwidth, a resource unit of the first channel bandwidth or the second channel bandwidth for the station. The operations of 1610 may be performed according to the methods described herein. In some implementations, aspects of the operations of 1610 may be performed by a resource unit identifier as described with reference to FIG. 9.

At 1615 the STA 115 may transmit a trigger-based frame to the access point based at least in part on the identified resource unit. The operations of 1615 may be performed according to the methods described herein. In some implementations, aspects of the operations of 1615 may be performed by a trigger-based frame transmitter as described with reference to FIG. 9.

Figure 17:
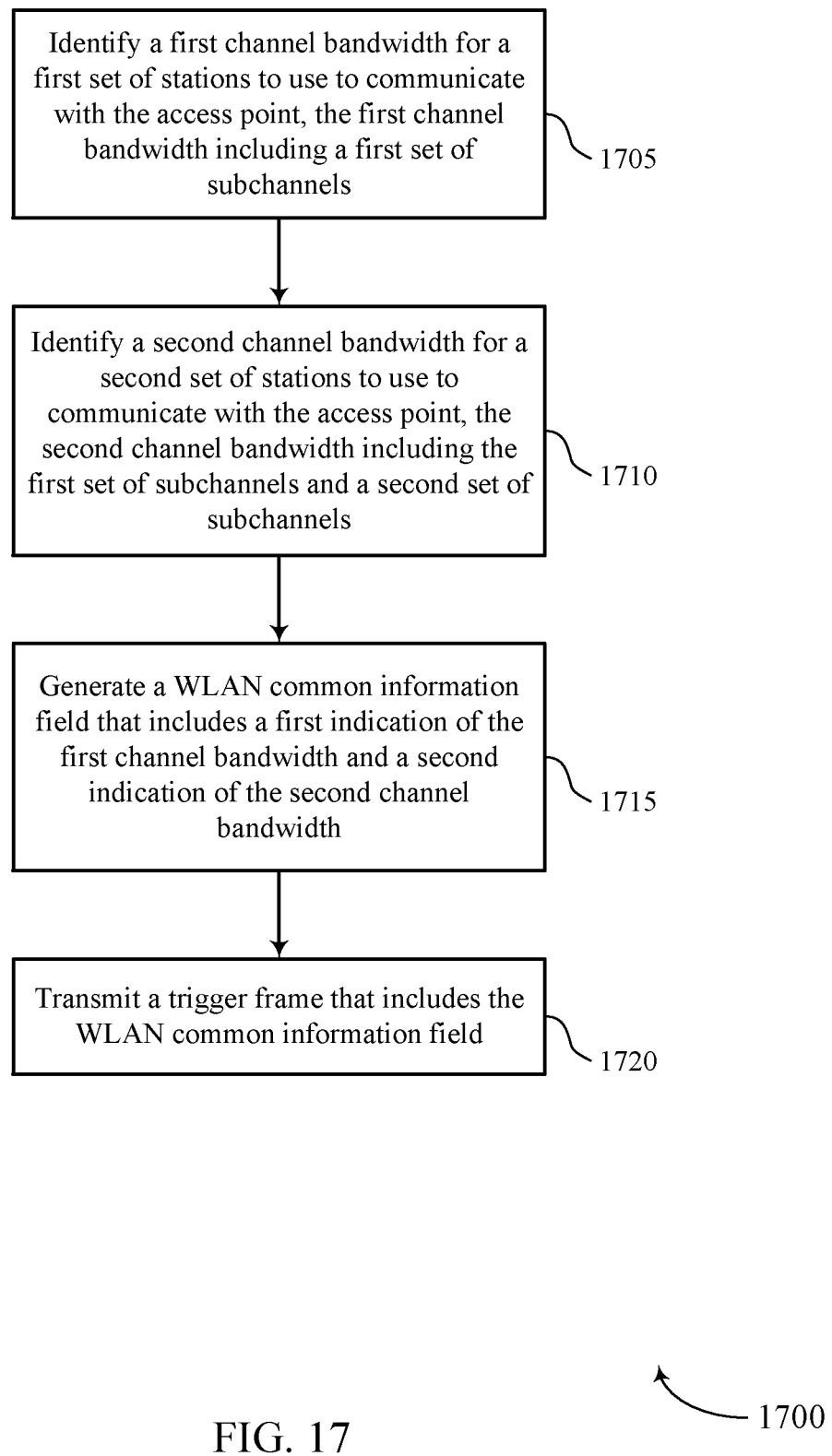

FIG. 17 shows a flowchart illustrating a method 1700 for multiplexing clients in wireless local area network transmissions. The operations of method 1700 may be implemented by an AP 105 or its components as described herein. For example, the operations of method 1700 may be performed by an AP communications manager as described with reference to FIG. 10. In some examples, an AP 105 may execute a set of codes to control the functional elements of the device to perform the functions described herein. Additionally, or alternatively, the AP 105 may perform aspects of the functions described herein using special-purpose hardware.

At 1705 the AP 105 may identify a first channel bandwidth for a first set of stations to use to communicate with the access point, the first channel bandwidth including a first set of subchannels. The operations of 1705 may be performed according to the methods described herein. In some implementations, aspects of the operations of 1705 may be performed by a channel bandwidth identifier as described with reference to FIG. 10.

At 1710 the AP 105 may identify a second channel bandwidth for a second set of stations to use to communicate with the access point, the second channel bandwidth including the first set of subchannels and a second set of subchannels. The operations of 1710 may be performed according to the methods described herein. In some implementations, aspects of the operations of 1710 may be performed by a channel bandwidth identifier as described with reference to FIG. 10.

At 1715 the AP 105 may generate a WLAN common information field the includes a first indication of the first channel bandwidth and a second indication of the second channel bandwidth. The operations of 1715 may be performed according to the methods described herein. In some implementations, aspects of the operations of 1715 may be performed by a common field generator as described with reference to FIG. 10.

At 1720 the AP 105 may transmit a trigger frame that includes the WLAN common information field. The operations of 1720 may be performed according to the methods described herein. In some implementations, aspects of the operations of 1720 may be performed by a trigger frame transmitter as described with reference to FIG. 10.

Figure 18:
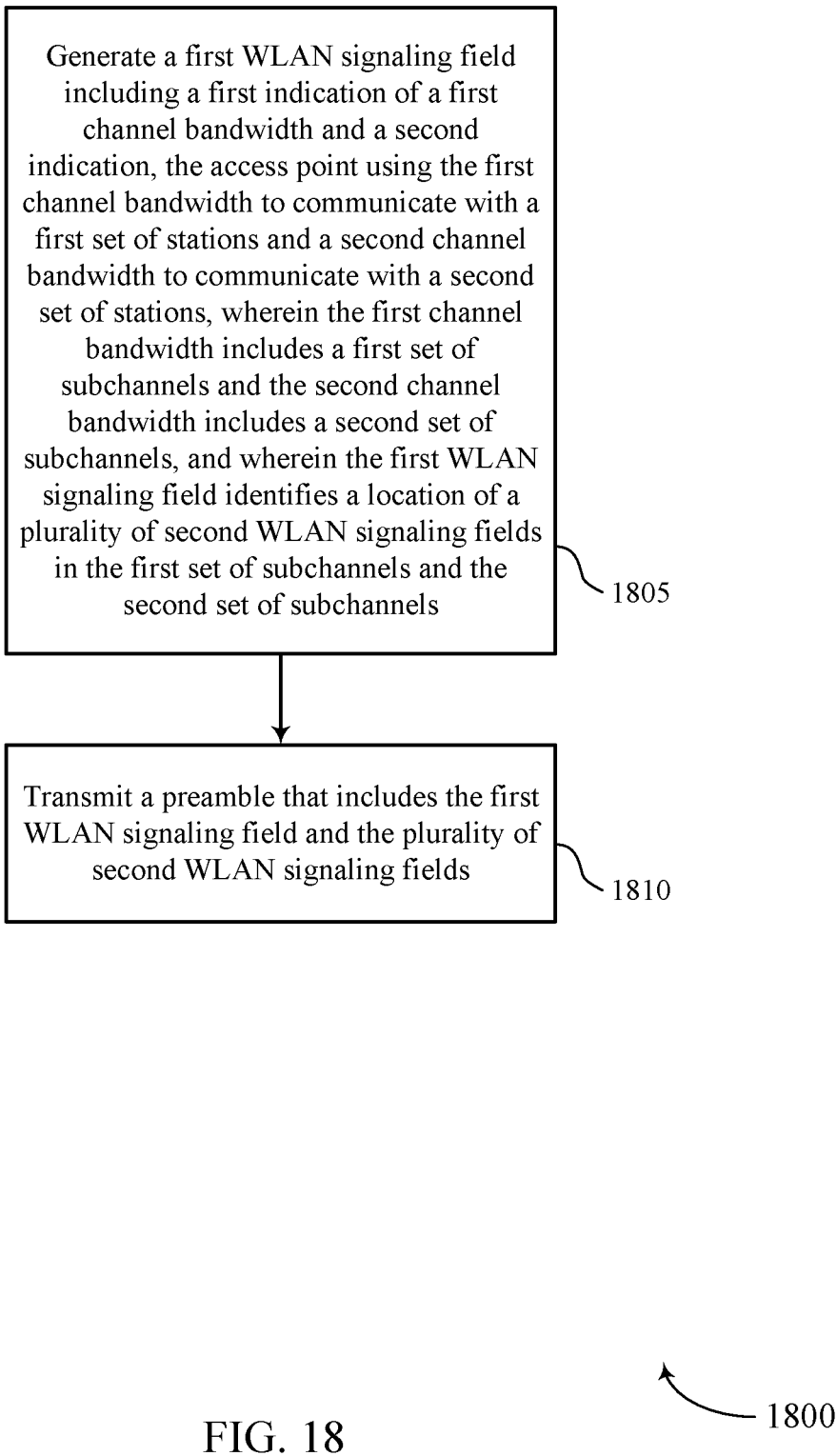

FIG. 18 shows a flowchart illustrating a method 1800 for multiplexing clients in wireless local area network transmissions. The operations of method 1800 may be implemented by an AP 105 or its components as described herein. For example, the operations of method 1800 may be performed by an AP communications manager as described with reference to FIG. 10. In some examples, an AP 105 may execute a set of codes to control the functional elements of the device to perform the functions described herein. Additionally, or alternatively, the AP 105 may perform aspects of the functions described herein using special-purpose hardware.

At 1805 the AP 105 may generate a first WLAN signaling field including a first indication of a first channel bandwidth and a second indication. The access point may use the first channel bandwidth to communicate with a first set of stations and a second channel bandwidth to communicate with a second set of stations. The first channel bandwidth may include a first set of subchannels and the second channel bandwidth may include a second set of subchannels. The first WLAN signaling field may identify a location of a plurality of second WLAN signaling fields in the first set of subchannels and the second set of subchannels. The operations of 1805 may be performed according to the methods described herein. In some implementations, aspects of the operations of 1805 may be performed by a signaling field generator as described with reference to FIG. 10.

At 1810 the AP 105 may transmit a preamble that includes the first WLAN signaling field and the plurality of second WLAN signaling fields. The operations of 1810 may be performed according to the methods described herein. In some implementations, aspects of the operations of 1810 may be performed by a preamble transmitter as described with reference to FIG. 10.

As used herein, a phrase referring to "at least one of" a list of items refers to any combination of those items, including single members. As an example, "at least one of: a, b, or c" is intended to cover: a, b, c, a-b, a-c, b-c, and a-b-c.

The various illustrative logics, logical blocks, modules, circuits and algorithm processes described in connection with the implementations disclosed herein may be implemented as electronic hardware, computer software, or combinations of both. The interchangeability of hardware and software has been described generally, in terms of functionality, and illustrated in the various illustrative components, blocks, modules, circuits and processes described herein. Whether such functionality is implemented in hardware or software depends upon the particular application and design constraints imposed on the overall system.

The hardware and data processing apparatus used to implement the various illustrative logics, logical blocks, modules and circuits described in connection with the aspects disclosed herein may be implemented or performed with a general purpose single- or multi-chip processor, a DSP, an ASIC, a FPGA or other programmable logic device, discrete gate or transistor logic, discrete hardware components, or any combination thereof designed to perform the functions described herein. A general-purpose processor may be a microprocessor, or, any conventional processor, controller, microcontroller, or state machine. A processor also may be implemented as a combination of computing devices, e.g., a combination of a DSP and a microprocessor, a plurality of microprocessors, one or more microprocessors in conjunction with a DSP core, or any other such configuration. In some implementations, particular processes and methods may be performed by circuitry that is specific to a given function.

In one or more aspects, the functions described may be implemented in hardware, digital electronic circuitry, computer software, firmware, including the structures disclosed in this specification and their structural equivalents thereof, or in any combination thereof. Implementations of the subject matter described in this specification also can be implemented as one or more computer programs, i.e., one or more modules of computer program instructions, encoded on a computer storage media for execution by, or to control the operation of, data processing apparatus.

If implemented in software, the functions may be stored on or transmitted over as one or more instructions or code on a computer-readable medium. The processes of a method or algorithm disclosed herein may be implemented in a processor-executable software module which may reside on a computer-readable medium. Computer-readable media includes both computer storage media and communication media including any medium that can be enabled to transfer a computer program from one place to another. A storage media may be any available media that may be accessed by a computer. By way of example, and not limitation, such computer-readable media may include RAM, ROM, EEPROM, CD-ROM or other optical disk storage, magnetic disk storage or other magnetic storage devices, or any other medium that may be used to store desired program code in the form of instructions or data structures and that may be accessed by a computer. Also, any connection can be properly termed a computer-readable medium. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the herein should also be included within the scope of computer-readable media. Additionally, the operations of a method or algorithm may reside as one or any combination or set of codes and instructions on a machine readable medium and computer-readable medium, which may be incorporated into a computer program product.

Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein but are to be accorded the widest scope consistent with this disclosure, the principles and the novel features disclosed herein.

Additionally, a person having ordinary skill in the art will readily appreciate, the terms "upper" and "lower" are sometimes used for ease of describing the figures, and indicate relative positions corresponding to the orientation of the figure on a properly oriented page, and may not reflect the proper orientation of any device as implemented.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described herein as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Further, the drawings may schematically depict one more example processes in the form of a flow diagram. However, other operations that are not depicted can be incorporated in the example processes that are schematically illustrated. For example, one or more additional operations can be performed before, after, simultaneously, or between any of the illustrated operations. In certain circumstances, multitasking and parallel processing may be advantageous. Moreover, the separation of various system components in the implementations described herein should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. An apparatus for wireless communication, comprising:
a first interface configured to receive a preamble from an access point, wherein the preamble comprises a first wireless local area network (WLAN) signaling field including a first indication of a first channel bandwidth and a second indication of a second channel bandwidth, wherein the access point uses the first channel bandwidth to communicate with a first set of stations and the second channel bandwidth to communicate with a second set of stations, and wherein the first channel bandwidth includes a first set of subchannels and the second channel bandwidth includes a second set of subchannels; and a processing system to determine, based at least in part on the first indication of the first channel bandwidth and the second indication of the second channel bandwidth, a location of at least one second WLAN signaling field.

2. The apparatus of claim 1, wherein:
the second channel bandwidth is a maximum channel bandwidth, and the location of the at least one second WLAN signaling field is in the second channel bandwidth.

3. The apparatus of claim 1, wherein:
the second channel bandwidth is a maximum channel bandwidth, and the location of the at least one second WLAN signaling field is in the first channel bandwidth.

4. The apparatus of claim 1, wherein:
the at least one second WLAN signaling field comprises two alternating WLAN signaling field content channels spanning the first channel bandwidth or the second channel bandwidth.

5. The apparatus of claim 1, wherein:
the processing system decodes the at least one second WLAN signaling field, the determined location of the at least one second WLAN signaling field in the second channel bandwidth, and determines a resource allocation for data transmissions in the second channel bandwidth based at least in part on the decoded at least one second WLAN signaling field.

6. The apparatus of claim 1, wherein:
the processing system decodes the at least one second WLAN signaling field, the determined location of the at least one second WLAN signaling field in the first channel bandwidth, and determines a resource allocation for data transmissions in the second channel bandwidth based at least in part on the decoded at least one second WLAN signaling field.

7. The apparatus of claim 6, wherein:
the determined resource allocation for data transmissions in the second channel bandwidth is exclusive of the first channel bandwidth.

8. The apparatus of claim 1, wherein:
the first indication of the first channel bandwidth comprises a value of a bandwidth field of the first WLAN signaling field.

9. The apparatus of claim 1, wherein:
the second indication comprises a combination of a value of a dual carrier modulation (DCM) field of the first WLAN signaling field and a value of a modulation and coding scheme (MCS) field of the first WLAN signaling field, the DCM field and the MCS field applicable to the second WLAN signaling field.

10. The apparatus of claim 1, wherein the apparatus is included in a station.

11. An apparatus for wireless communication, comprising:
a first interface configured to receive a preamble from an access point, wherein the preamble comprises a first wireless local area network (WLAN) signaling field including a first indication of a first channel bandwidth and a second indication of subchannel puncturing, wherein the access point uses the first channel bandwidth to communicate with a first set of stations and a second channel bandwidth to communicate with a second set of stations, and wherein the first channel bandwidth includes a first set of subchannels and the second channel bandwidth includes a second set of subchannels; and a processing system to identify, based at least in part on the second indication of subchannel puncturing, that a first subset of the first set of subchannels is punctured, wherein a location of at least one second WLAN signaling field is determined to be in the first subset of the first set of subchannels identified as punctured.

12. The apparatus of claim 11, wherein:
the processing system decodes a first of the at least one second WLAN signaling field in the first subset of the first set of subchannels identified as punctured, and determines a first resource allocation for data transmissions in the second channel bandwidth based at least in part on the decoded first of the at least one second WLAN signaling field.

13. The apparatus of claim 11, wherein:
the second indication comprises a value of a bandwidth field of the first WLAN signaling field that indicates that the first subset of the first set of subchannels is punctured.

14. The apparatus of claim 11, wherein:
the first indication comprises an indication of preamble puncturing for the first channel bandwidth that indicates that the first subset of the first set of subchannels is punctured.

15. An apparatus for wireless communication, comprising:
a processing system to generate a first wireless local area network (WLAN) signaling field including a first indication of a first channel bandwidth and a second indication of a second channel bandwidth, wherein the first channel bandwidth includes a first set of subchannels and the second channel bandwidth includes a second set of subchannels, and wherein the first WLAN signaling field identifies a location of a plurality of second WLAN signaling fields in the first set of subchannels and the second set of subchannels; and an interface configured to output a preamble for transmission by an access point to one or more stations of a first set of stations or a second set of stations, wherein the preamble comprises the first WLAN signaling field and the plurality of second WLAN signaling fields, and the access point uses the first channel bandwidth to communicate with the first set of stations and the second channel bandwidth to communicate with the second set of stations.

16. The apparatus of claim 15, wherein:
the processing system generates a first set of the plurality of second WLAN signaling fields for the first set of stations in the first set of subchannels, and generates a second set of the plurality of second WLAN signaling fields for the second set of stations in the second set of sub channels.

17. The apparatus of claim 16, wherein:
the first set of the plurality of second WLAN signaling fields comprises two alternating WLAN signaling field content channels spanning the first channel bandwidth; and
the second set of the plurality of second WLAN signaling fields comprises two alternating WLAN signaling field content channels spanning the second channel bandwidth.

18. The apparatus of claim 15, wherein:
the first indication of the first channel bandwidth comprises a value of a bandwidth field of the first WLAN signaling field.

19. The apparatus of claim 15, wherein:
the second indication comprises a combination of a value of a dual carrier modulation (DCM) field of the first WLAN signaling field and a value of a modulation and coding scheme (MCS) field of the first WLAN signaling field, the DCM field and the MCS field applicable to the second WLAN signaling field.

20. The apparatus of claim 15, wherein:
the first WLAN signaling field comprises a high efficiency signaling A (HE-SIG-A) field, or a legacy signaling field (L-SIG), or a repeated L-SIG (RL-SIG) field, or a combination thereof, wherein the second channel bandwidth is indicated at least in part by the L-SIG field, or the RL-SIG field, or a combination thereof.

21. The apparatus of claim 15, wherein:
the processing system allocates resource units for data transmissions to the first set of stations in the first channel bandwidth exclusive of the second channel bandwidth, and allocates resource units for data transmissions to the second set of stations in the second channel bandwidth exclusive of the first channel bandwidth.

22. The apparatus of claim 15, wherein the apparatus is included in the access point.

23. An apparatus for wireless communication, comprising:
a processing system to generate a first wireless local area network (WLAN) signaling field including a first indication of a first channel bandwidth and a second indication identifying a first subset of a first set of subchannels as punctured, wherein the first channel bandwidth includes a first set of subchannels and a second channel bandwidth includes a second set of subchannels, and wherein the first WLAN signaling field identifies a location of a plurality of second WLAN signaling fields in the first set of subchannels and the second set of subchannels; and
an interface configured to output a preamble for transmission by an access point to one or more stations of a first set of stations or a second set of stations, wherein the preamble comprises the first WLAN signaling field and the plurality of second WLAN signaling fields, and the access point uses the first channel bandwidth to communicate with the first set of stations and the second channel bandwidth to communicate with the second set of stations.

24. The apparatus of claim 23, wherein:
the second indication that identifies the first subset of the first set of subchannels as punctured comprises an indication of preamble puncturing for the first channel bandwidth.

25. A method for wireless communication at a station, comprising:
receiving, from an access point, a preamble that includes a first wireless local area network (WLAN) signaling field including a first indication of a first channel bandwidth and a second indication of a second channel bandwidth, wherein the access point uses the first channel bandwidth to communicate with a first set of stations and the second channel bandwidth to communicate with a second set of stations that includes the station, and wherein the first channel bandwidth includes a first set of subchannels and the second channel bandwidth includes a second set of subchannels; and
determining, based at least in part on the first indication of the first channel bandwidth and the second indication of the second channel bandwidth, a location of at least one second WLAN signaling field for the station.

26. A method for wireless communication at a station, comprising:
receiving, from an access point, a preamble that includes a first wireless local area network (WLAN) signaling field including a first indication of a first channel bandwidth and a second indication of subchannel puncturing, wherein the access point uses the first channel bandwidth to communicate with a first set of stations and a second channel bandwidth to communicate with a second set of stations that includes the station, and wherein the first channel bandwidth includes a first set of subchannels and the second channel bandwidth includes a second set of subchannels; and
identifying, based at least in part on the second indication of subchannel puncturing, that a first subset of the first set of subchannels is punctured, wherein a location of at least one second WLAN signaling field for the station is determined to be in the first subset of the first set of subchannels identified as punctured.

27. A method for wireless communication at an access point, comprising:
generating a first wireless local area network (WLAN) signaling field including a first indication of a first channel bandwidth and a second indication of a second channel bandwidth, the access point using the first channel bandwidth to communicate with a first set of stations and the second channel bandwidth to communicate with a second set of stations, wherein the first channel bandwidth includes a first set of subchannels and the second channel bandwidth includes a second set of subchannels, and wherein the first WLAN signaling field identifies a location of a plurality of second WLAN signaling fields in the first set of subchannels and the second set of subchannels; and
transmitting a preamble that includes the first WLAN signaling field and the plurality of second WLAN signaling fields.

28. A method for wireless communication at an access point, comprising:
generating a first wireless local area network (WLAN) signaling field including a first indication of a first channel bandwidth and a second indication identifying a first subset of a first set of subchannels as punctured, the access point using the first channel bandwidth to communicate with a first set of stations and a second channel bandwidth to communicate with a second set of stations, wherein the first channel bandwidth includes a first set of subchannels and the second channel bandwidth includes a second set of subchannels, and wherein the first WLAN signaling field identifies a location of a plurality of second WLAN signaling fields in the first set of subchannels and the second set of subchannels; and
transmitting a preamble that includes the first WLAN signaling field and the plurality of second WLAN signaling fields.

* * * * *